(12) United States Patent
Shanmugam et al.

(10) Patent No.: US 11,030,412 B2
(45) Date of Patent: Jun. 8, 2021

(54) SYSTEM AND METHOD FOR CHATBOT CONVERSATION CONSTRUCTION AND MANAGEMENT

(71) Applicant: Verizon Patent and Licensing Inc., Basking Ridge, NJ (US)

(72) Inventors: Sankar Shanmugam, Dayton, NJ (US); Sreeharsha Lanka, Bridgewater, NJ (US); Pradeep Bharthur Shanthraj, Piscataway, NJ (US); Neil Thomas Razzano, Hillsborough, NJ (US); Shankar Venkatesan, Edison, NJ (US); Trisha Mahajan, Princeton Junction, NJ (US); Stephen John Soltys, Warren, NJ (US); Moorthy Sengottaiyan, Somerset, NJ (US); Saivivek Thiyagarajan, Ashburn, VA (US); Ahmed Pasha Mohammed, Piscataway, NJ (US); Sandeep Kumar, Piscataway, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 170 days.

(21) Appl. No.: 15/949,893

(22) Filed: Apr. 10, 2018

(65) Prior Publication Data
US 2019/0311036 A1    Oct. 10, 2019

(51) Int. Cl.
*G06F 40/30*      (2020.01)
*H04L 12/58*      (2006.01)
(Continued)

(52) U.S. Cl.
CPC ............ *G06F 40/30* (2020.01); *G06F 16/951* (2019.01); *G06N 20/00* (2019.01); *H04L 51/02* (2013.01); *G06Q 30/04* (2013.01)

(58) Field of Classification Search
CPC ............. G06F 11/3664; G06F 11/3684; G06F 11/3688; G06F 11/3476; G06F 2201/865;
(Continued)

(56) References Cited

U.S. PATENT DOCUMENTS 9,813,504 B2 * 11/2017 Kumar ...................... G06F 9/54
10,139,789 B2 * 11/2018 Soni ...................... G05B 15/02
(Continued)

*Primary Examiner* — Michael Ortiz-Sanchez

(57) ABSTRACT

A system is disclosed for chatbot conversation construction, and includes user interface, coupled to a conversation construction and management platform, configured to provide entry of intents, associated responses and search terms, and to construct and store conversation controllers, each based at least in part on one or more of the intents, and build conversation flows, each based at least in part on one or more of the conversation controllers. An artificial intelligence (AI) connector platform couples to the conversation construction and management platform, and is configured to receive natural language (NL) search data from a chatbot channel, format the NL search data into an input protocol of a selectable NL processing engine and receive a response from the NLP engine and, based at least in part on one or more of the conversation flows, convert the NLP engine response to a personalized response, and send the personalized response to the chatbot channel.

20 Claims, 23 Drawing Sheets

(51) Int. Cl.
*G06N 20/00* (2019.01)
*G06F 16/951* (2019.01)
*G06Q 30/04* (2012.01)

(58) Field of Classification Search
CPC .. G06F 16/3329; G06F 16/3344; G06F 17/50; G06F 2217/04; G06F 16/245; G06F 16/5846; G06F 16/90335; G06F 17/21; G06F 17/2881; G06F 3/167; G06F 40/216; G06F 40/56; G06F 16/90332; G06F 40/289; G06F 40/30; G10L 15/22; G10L 2015/223; G10L 15/1822; G10L 15/26; G10L 17/22; H04L 12/1813; H04L 29/06; H04L 51/046; H04L 51/02; H04L 67/02; H04L 67/42; H04L 51/04; G06N 20/00
See application file for complete search history.

(56) References Cited

U.S. PATENT DOCUMENTS

| | | | |
|---|---|---|---|
| 10,388,274 B1* | 8/2019 | Hoffmeister | G06F 16/24522 |
| 2005/0091057 A1* | 4/2005 | Phillips | G10L 15/22 704/270.1 |
| 2005/0125232 A1* | 6/2005 | Gadd | G06Q 30/02 704/270.1 |
| 2005/0203747 A1* | 9/2005 | Lecoeuche | H04M 3/4938 704/270.1 |
| 2007/0047719 A1* | 3/2007 | Dhawan | H04M 1/2478 379/235 |
| 2014/0164476 A1* | 6/2014 | Thomson | G06Q 10/101 709/203 |
| 2016/0092447 A1* | 3/2016 | Venkataraman | G06F 16/43 707/765 |
| 2016/0110422 A1* | 4/2016 | Roytman | G06N 5/00 706/12 |
| 2016/0173578 A1* | 6/2016 | Sharma | G06F 17/2785 709/203 |
| 2018/0052664 A1* | 2/2018 | Zhang | G06F 8/34 |
| 2018/0054523 A1* | 2/2018 | Zhang | G06F 17/2785 |
| 2018/0061420 A1* | 3/2018 | Patil | G06F 3/0482 |
| 2018/0176269 A1* | 6/2018 | Griffin | H04L 67/02 |
| 2018/0212904 A1* | 7/2018 | Smullen | H04L 67/322 |
| 2018/0285768 A1* | 10/2018 | Karuppasamy | H04L 41/0631 |
| 2018/0293484 A1* | 10/2018 | Wang | G06N 3/006 |
| 2018/0358001 A1* | 12/2018 | Amid | G10L 15/1815 |
| 2018/0359132 A1* | 12/2018 | Salameh | G06F 3/0481 |
| 2019/0042988 A1* | 2/2019 | Brown | G06N 20/00 |
| 2019/0043106 A1* | 2/2019 | Talmor | G06N 20/00 |

* cited by examiner

"Tree.View_Bill" 201     Fallback Intent?   No ⊘ 208  Yes   Save 206   Delete 207

∨ User Expressions   202

Enter the Training String   203                 Add 204
                                                             205
| "account charges" |
| "amount due" |
| "AMOUNT OF BILL" |
| "BALANCE ON BILL" |
| "Bill for this month" |
| "CHECK MY BILL" |
| "How much do I owe" |
| "current bill" |
| "current amount due" |
| "FIND MY BILL" |

FIG. 2

FB                    301
Payload

```
{                                                      302
  "client" : "Facebook_Messenger",
  "chat": [
    "You can view, save and print your monthly bills through My Smith Service.",
    "To download a copy of your printable bill.",
    "Go the View Bill page in My Smith Service."
  ]
  "choices": [
    {
      "label": "View Bill",
      "url": "https://myaccount.smithservice.com/clp/logn?redirect=XXX#/"
    }
  ].
```

FIG. 3

MF                    401
Payload

```
{                                                      402
  "client": "MFChat",
  "faq": [
    "We're very sorry to hear about your loss. Please contact us directly at (800) 922-0204 for further assistance."
  ]
}
  {
    "label": "View Bill",
    "url": "https://myaccount.smith.com/clp/logn?redirect=XXX#/"
  }
].
```

FIG. 4

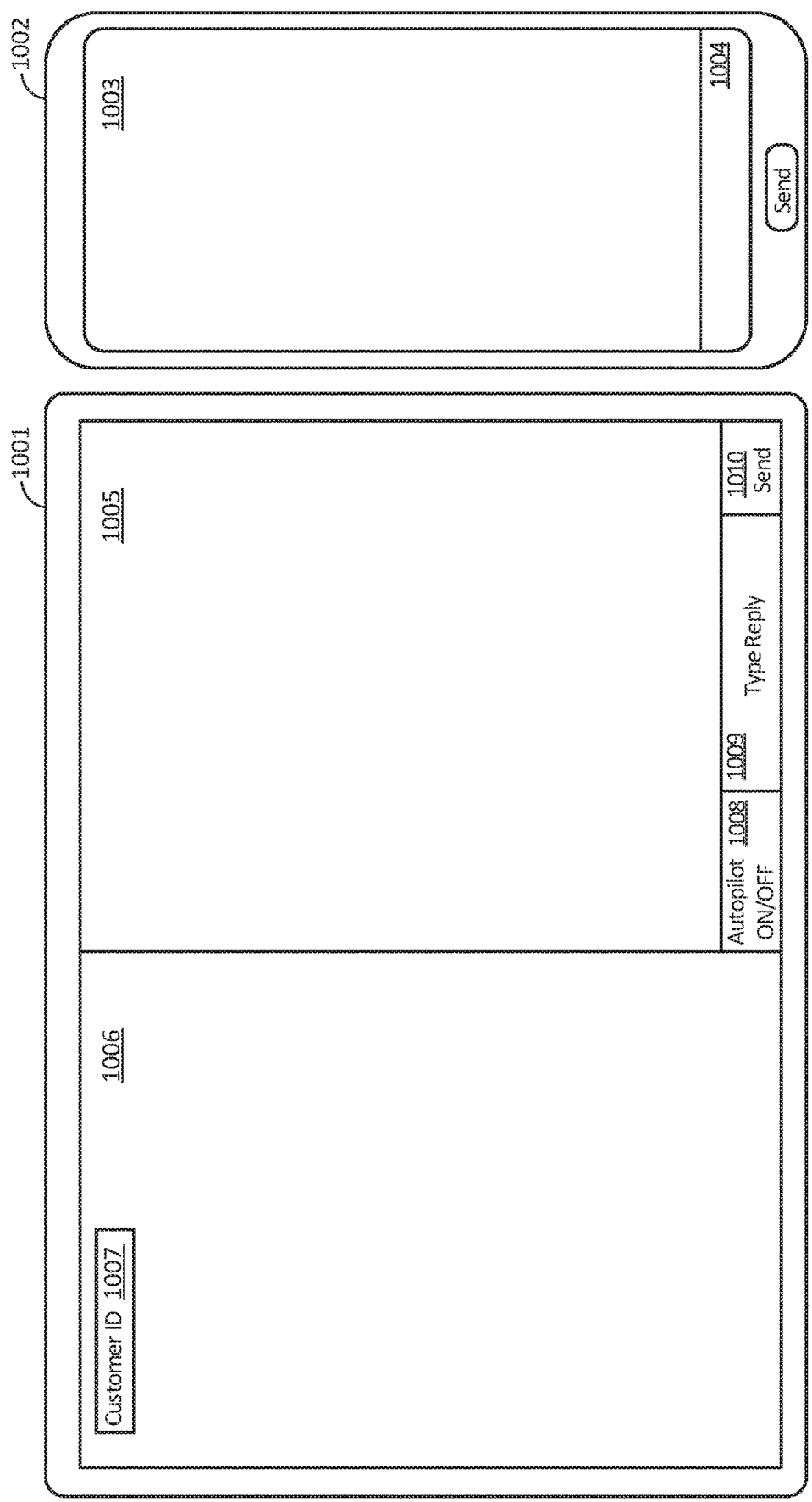
FIG. 10-A

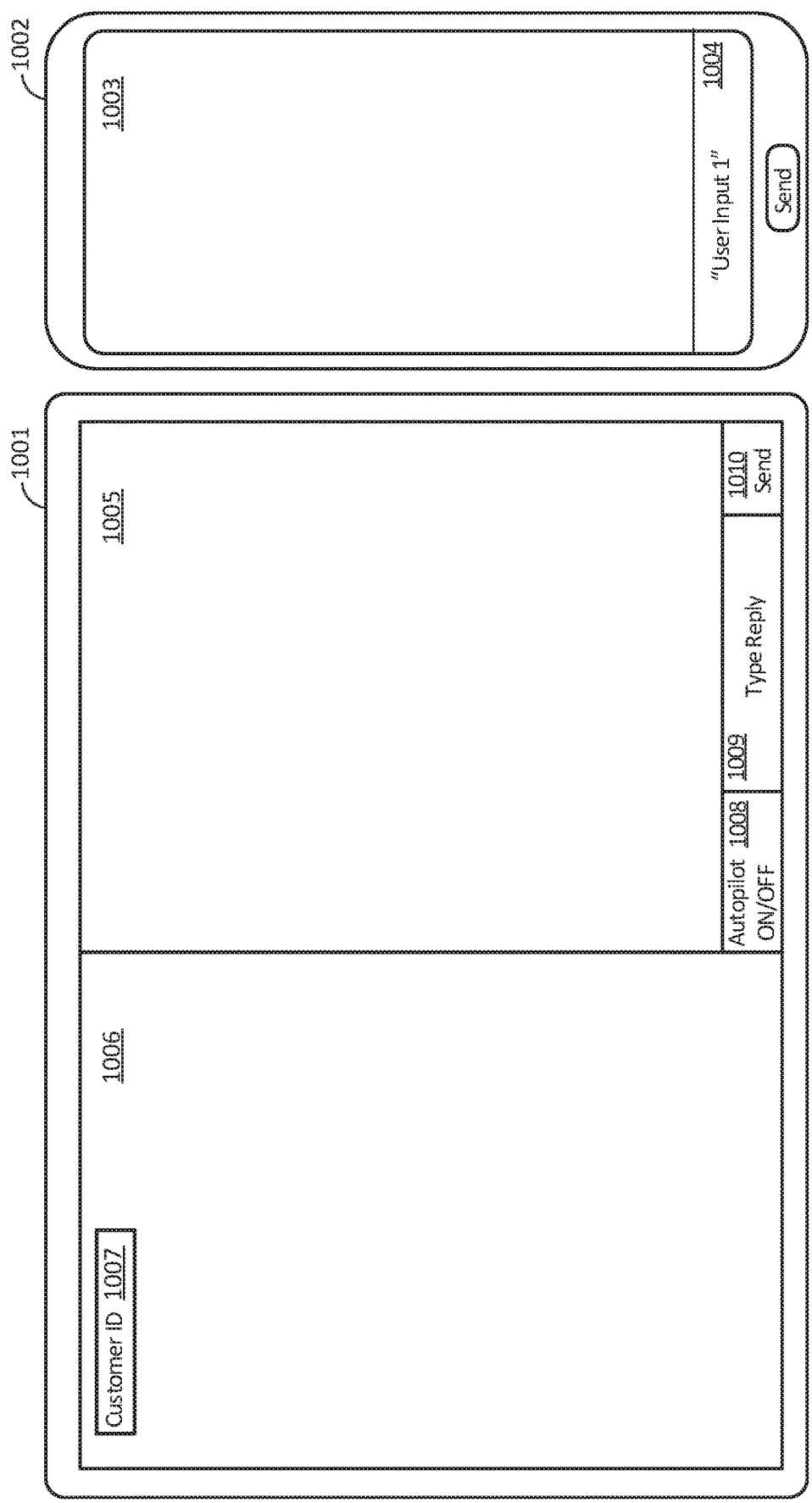
FIG. 10-B

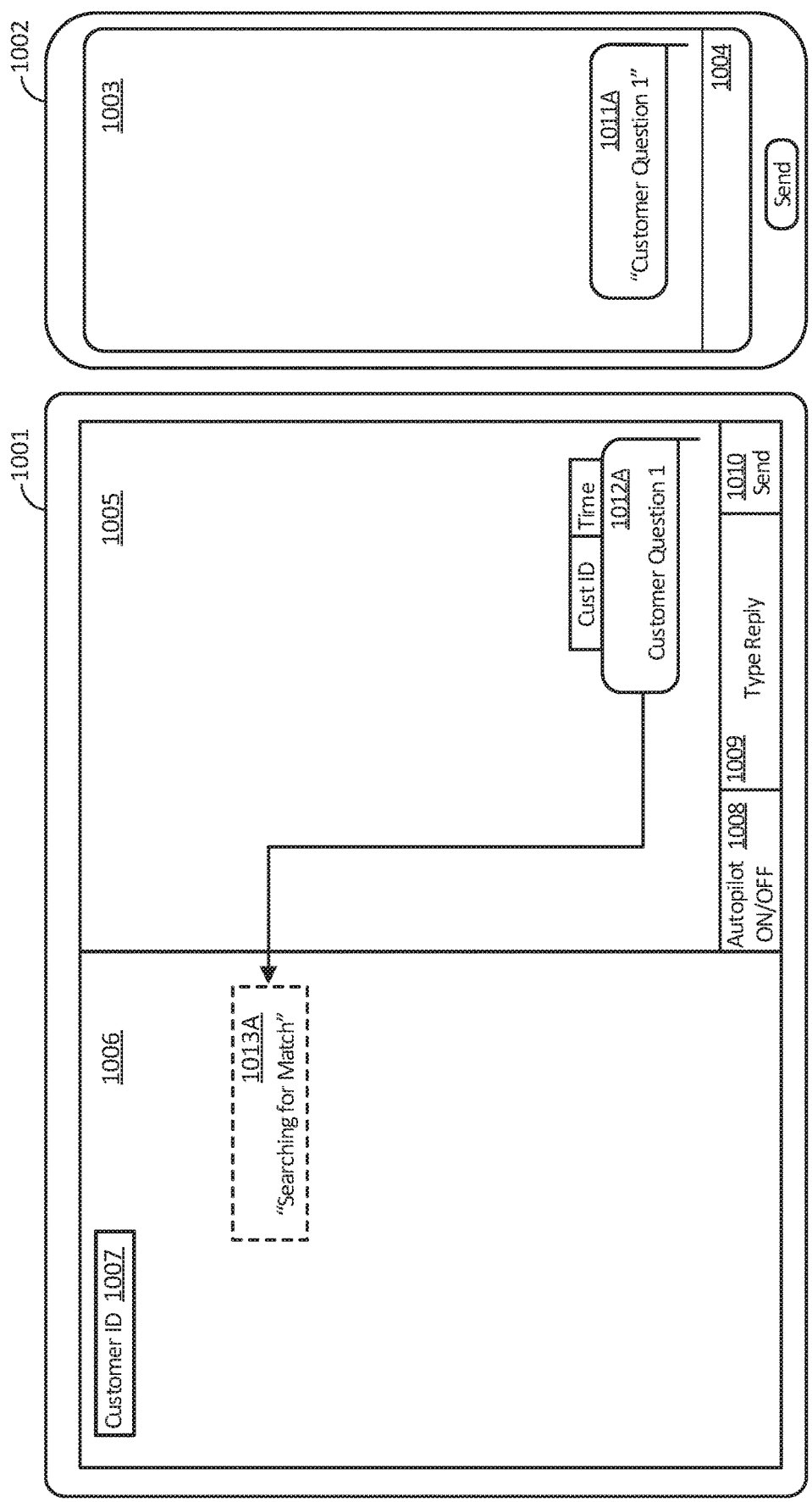
FIG. 10-C

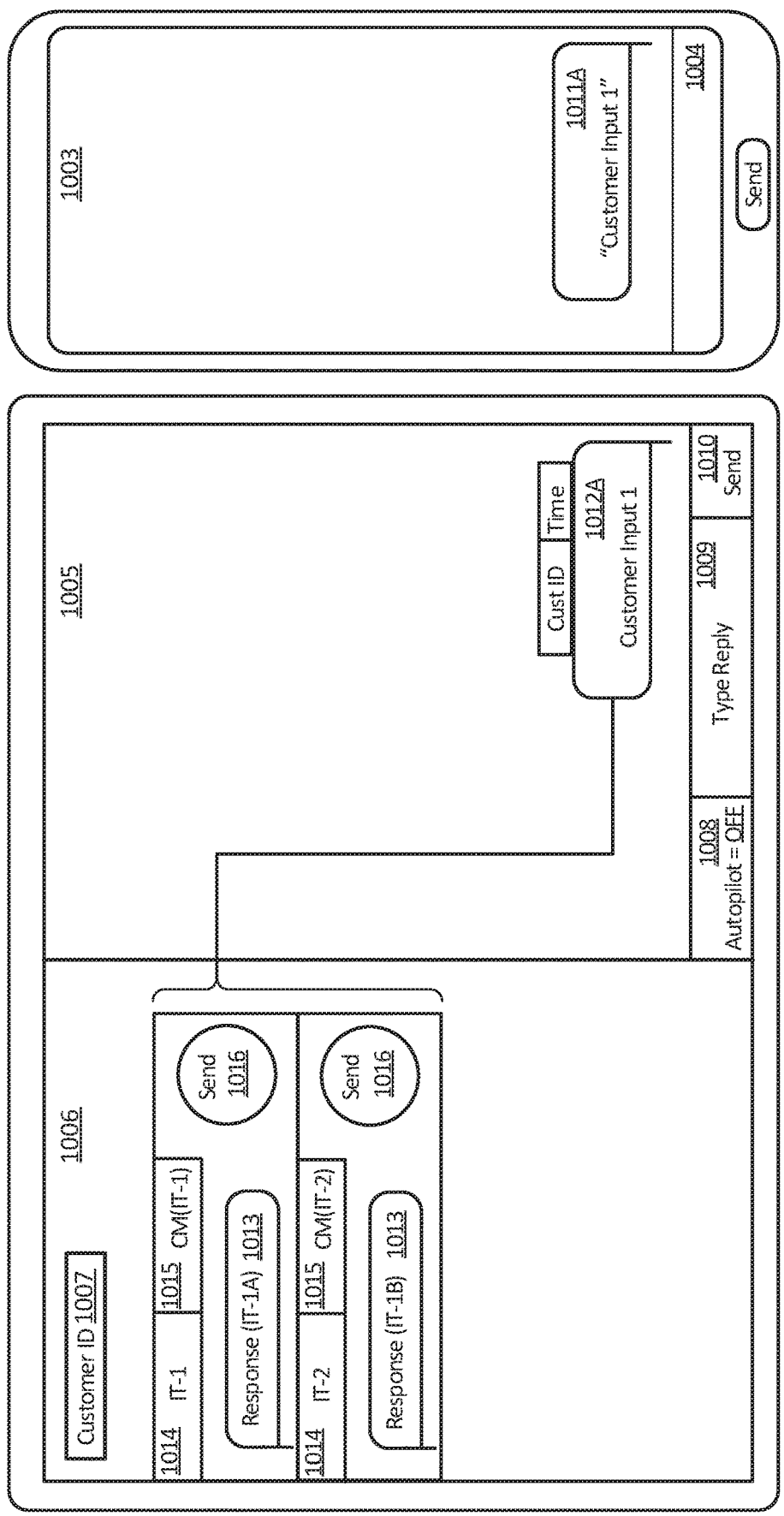
FIG. 10-D

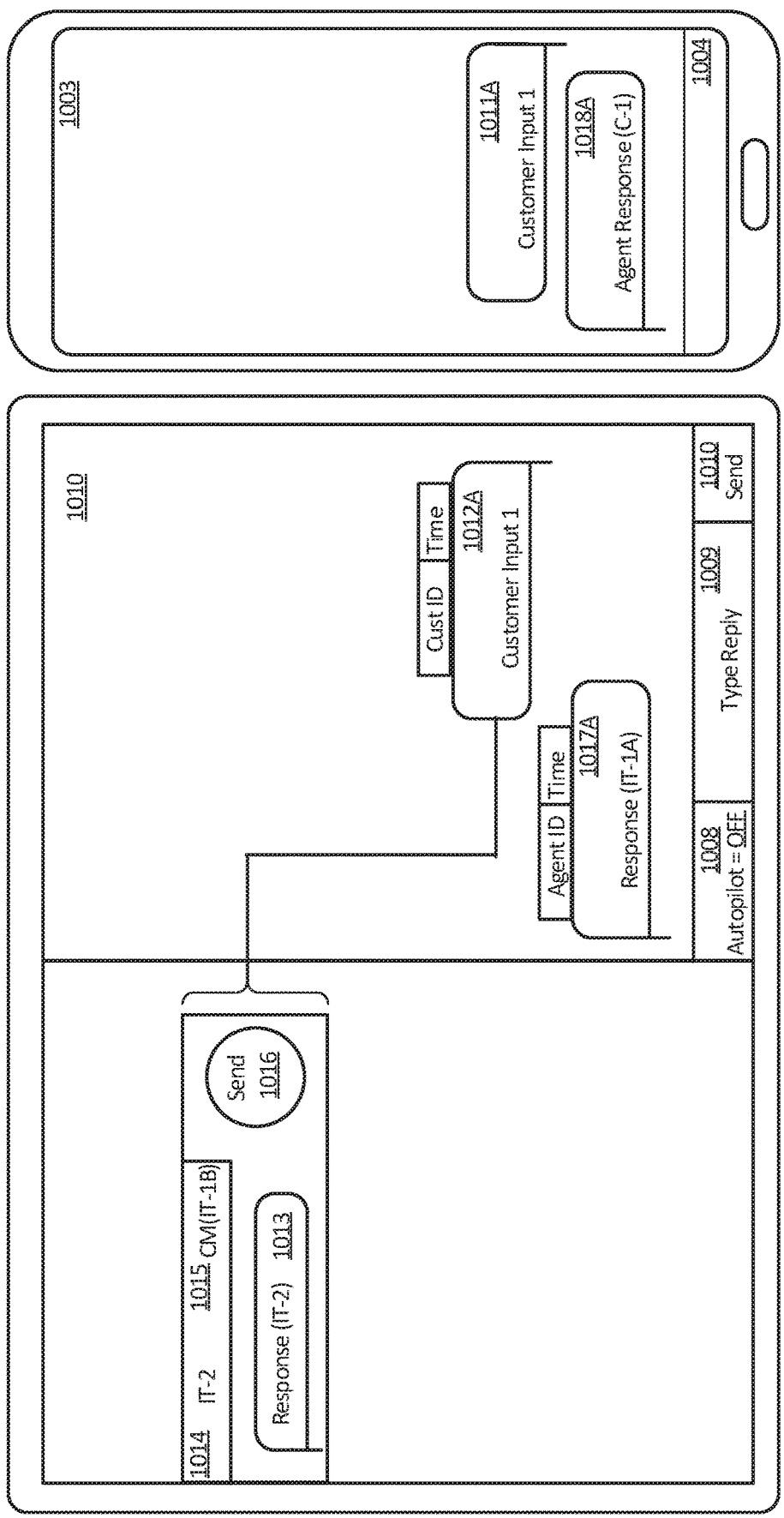
FIG. 10-E

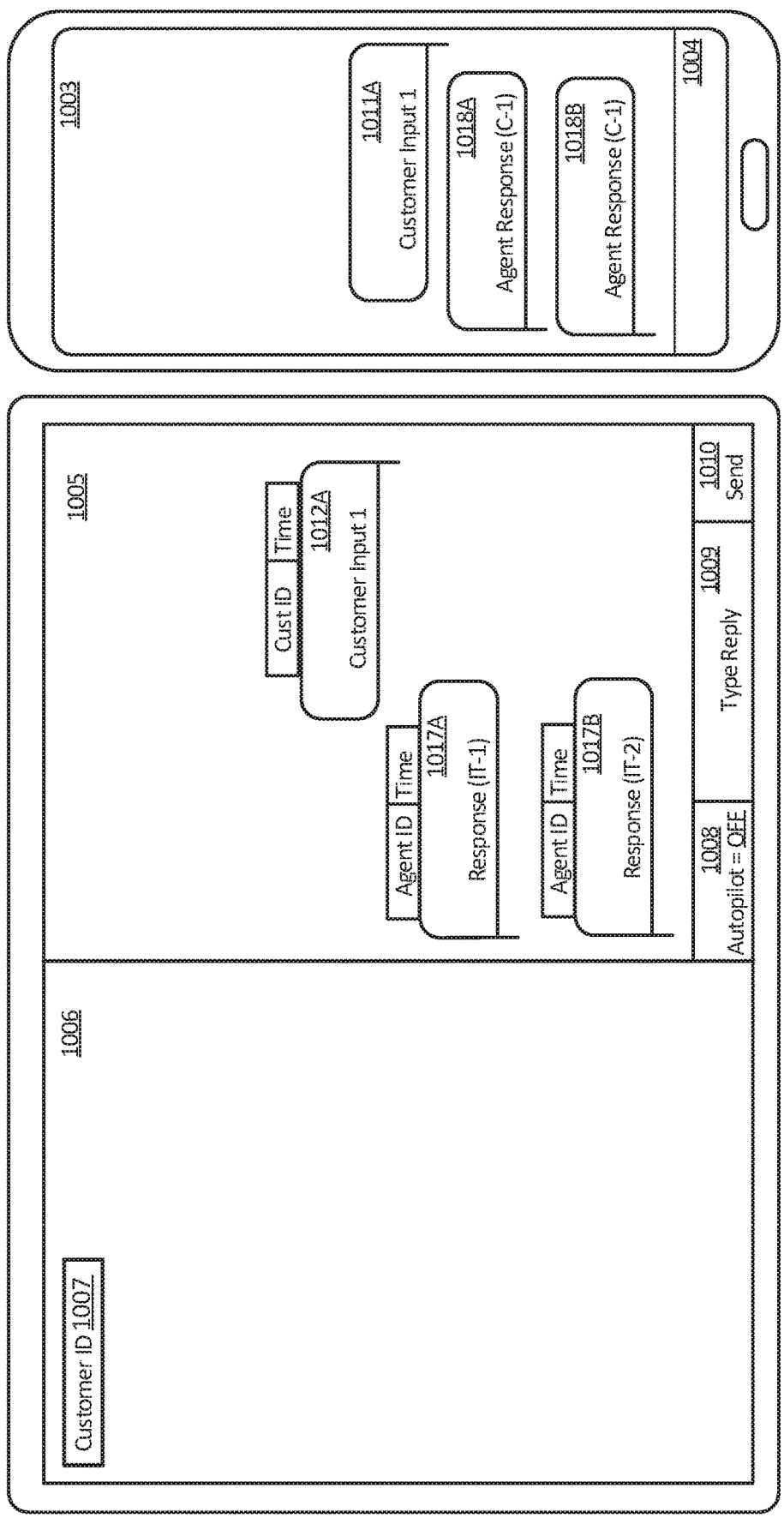
FIG. 10-F

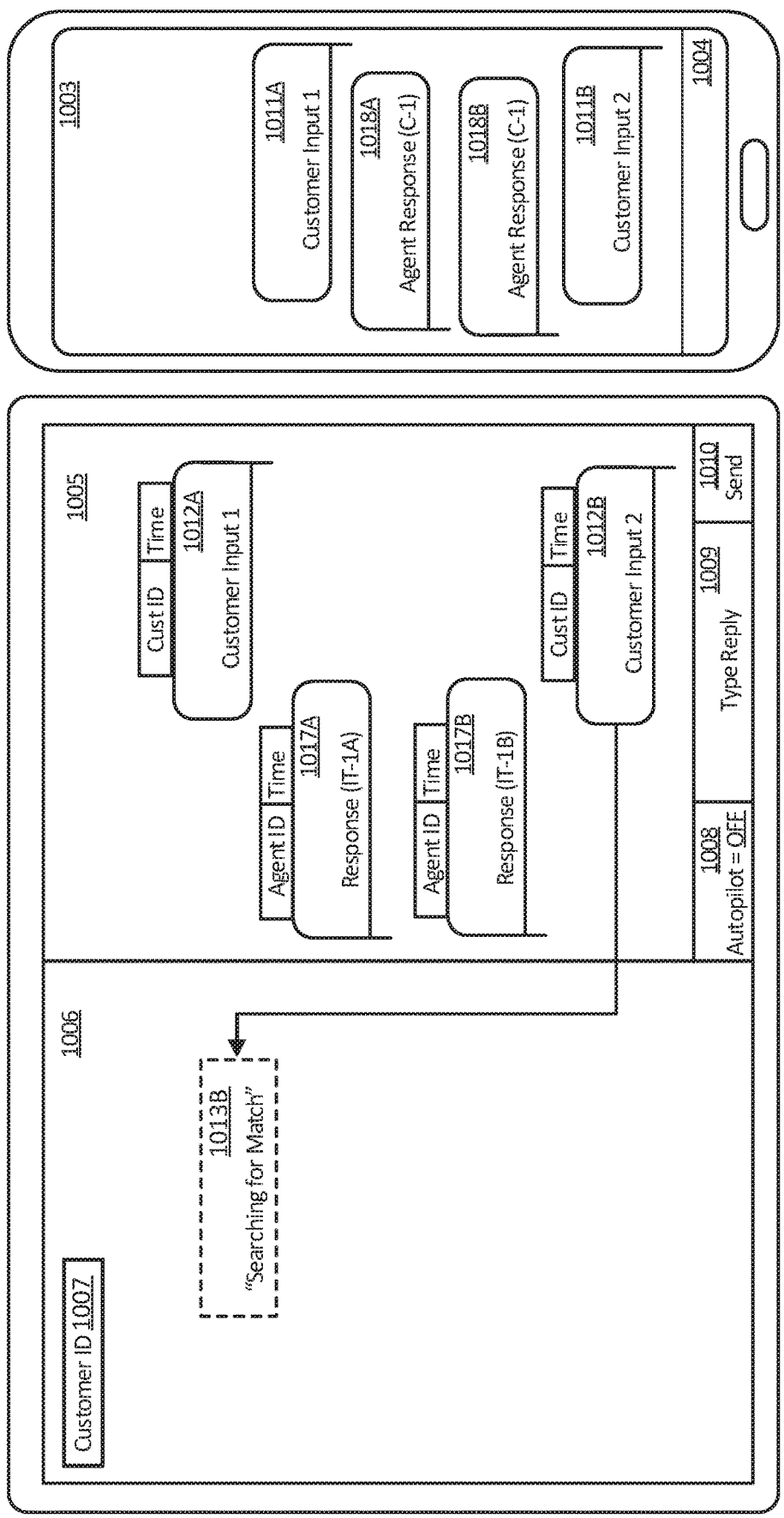
FIG. 10-G

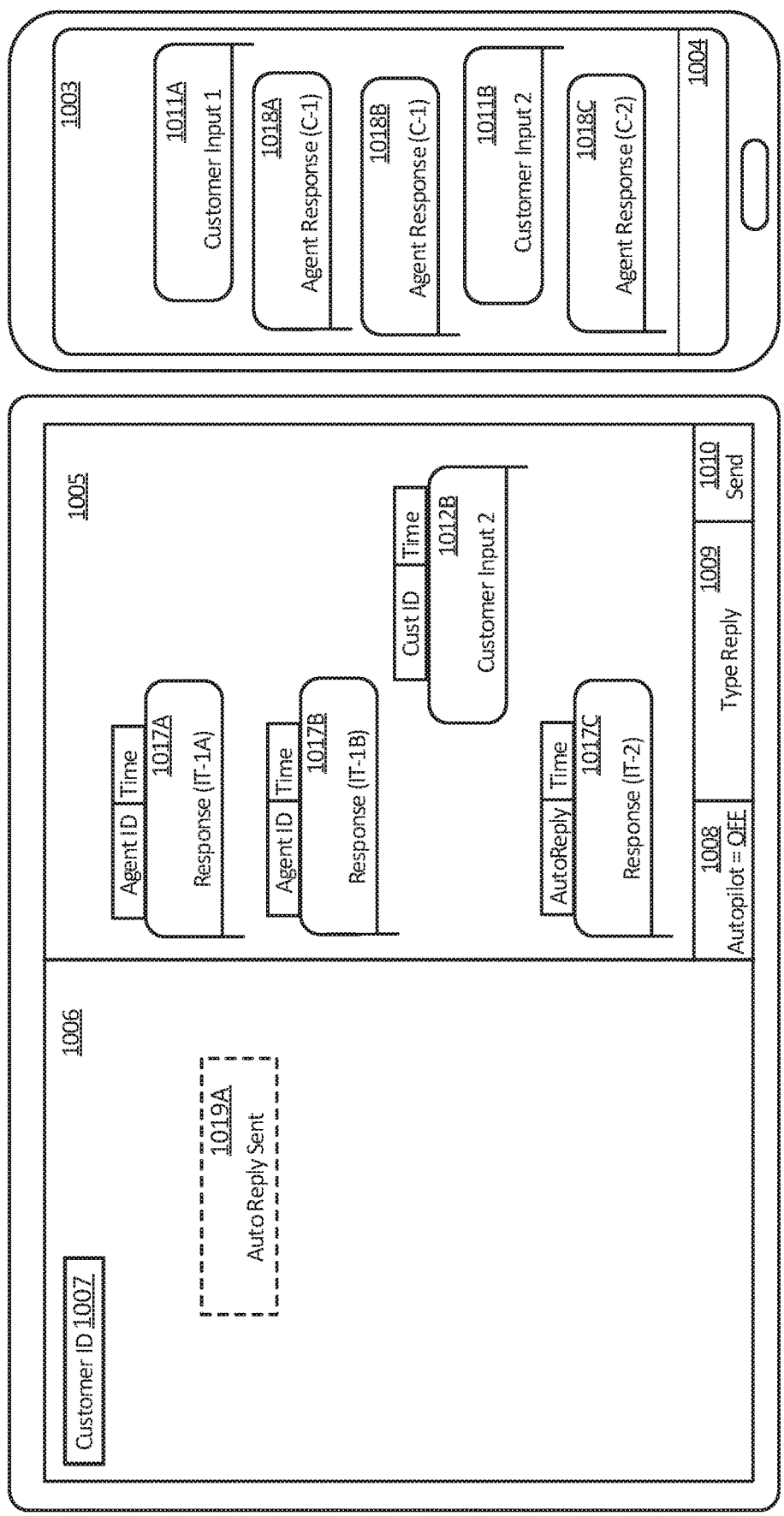
FIG. 10-H

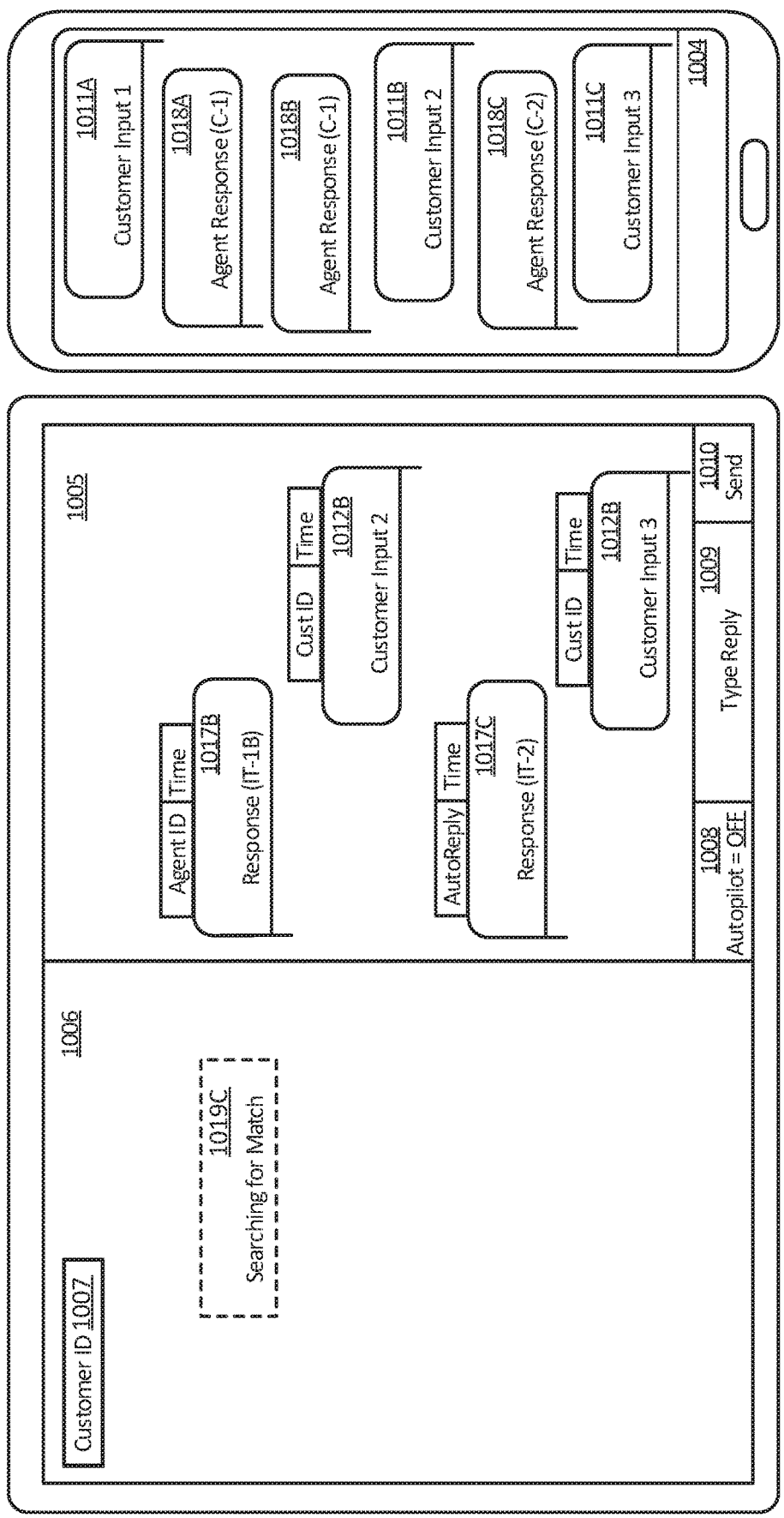
FIG. 10-I

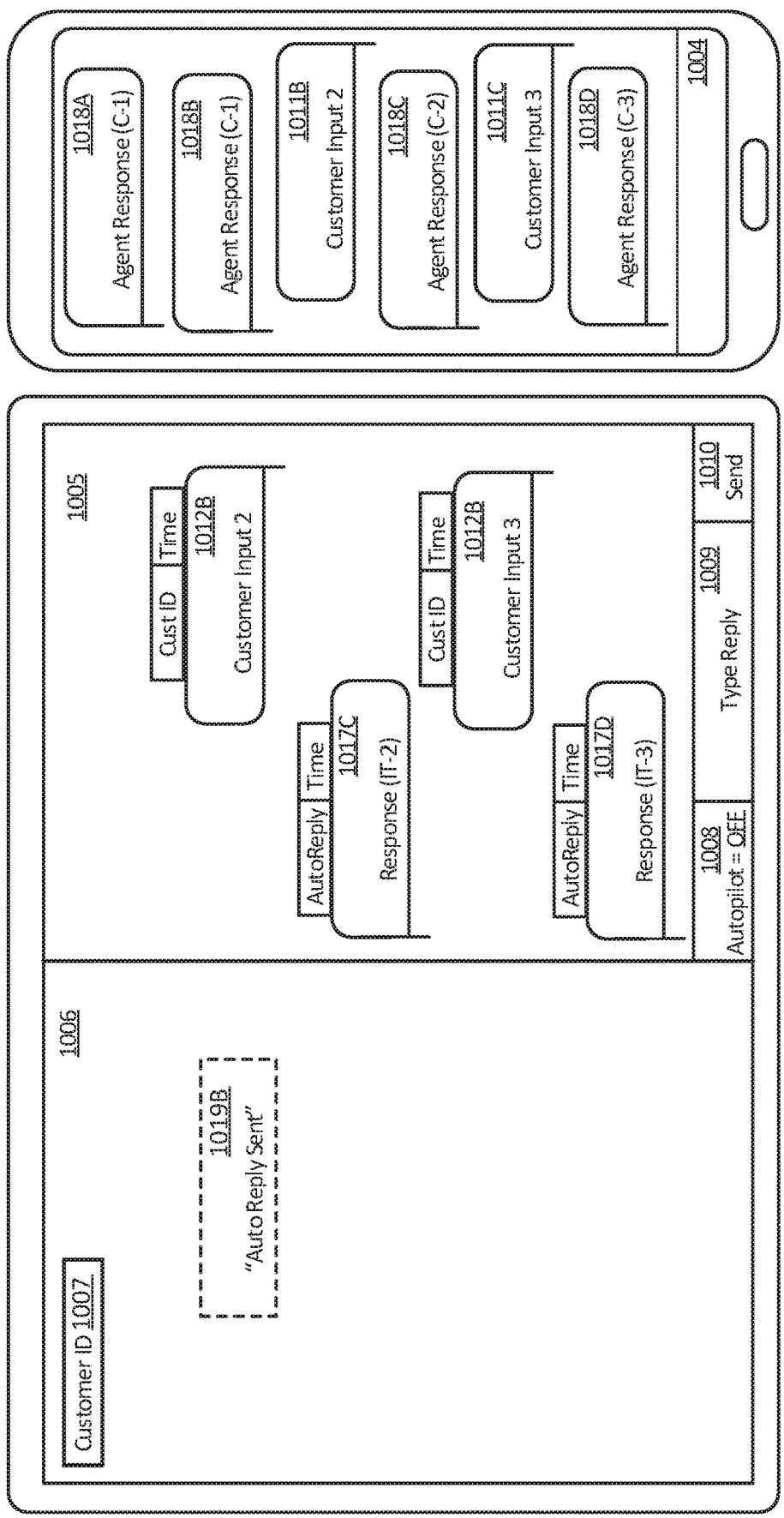
FIG. 10-J

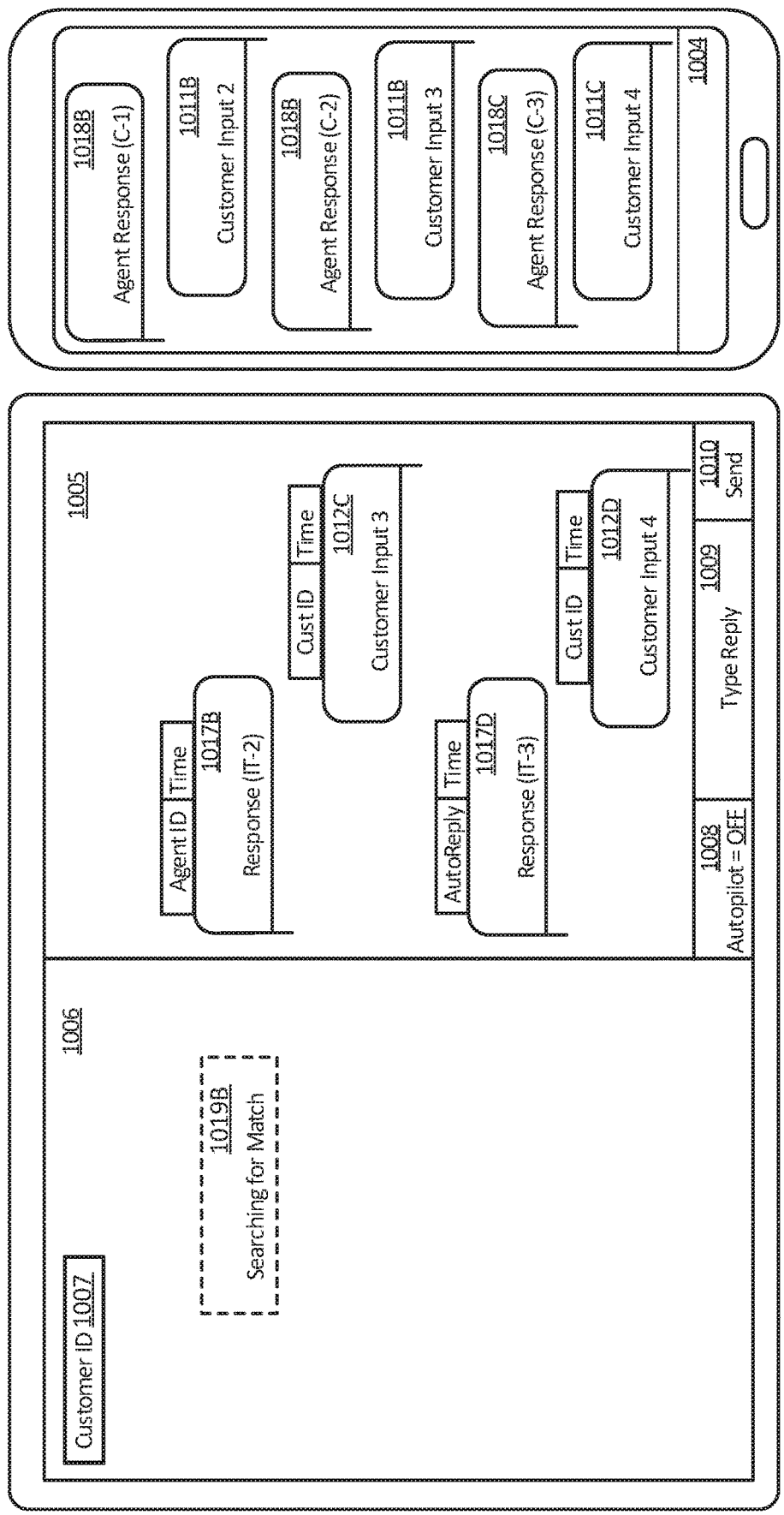
FIG. 10-K

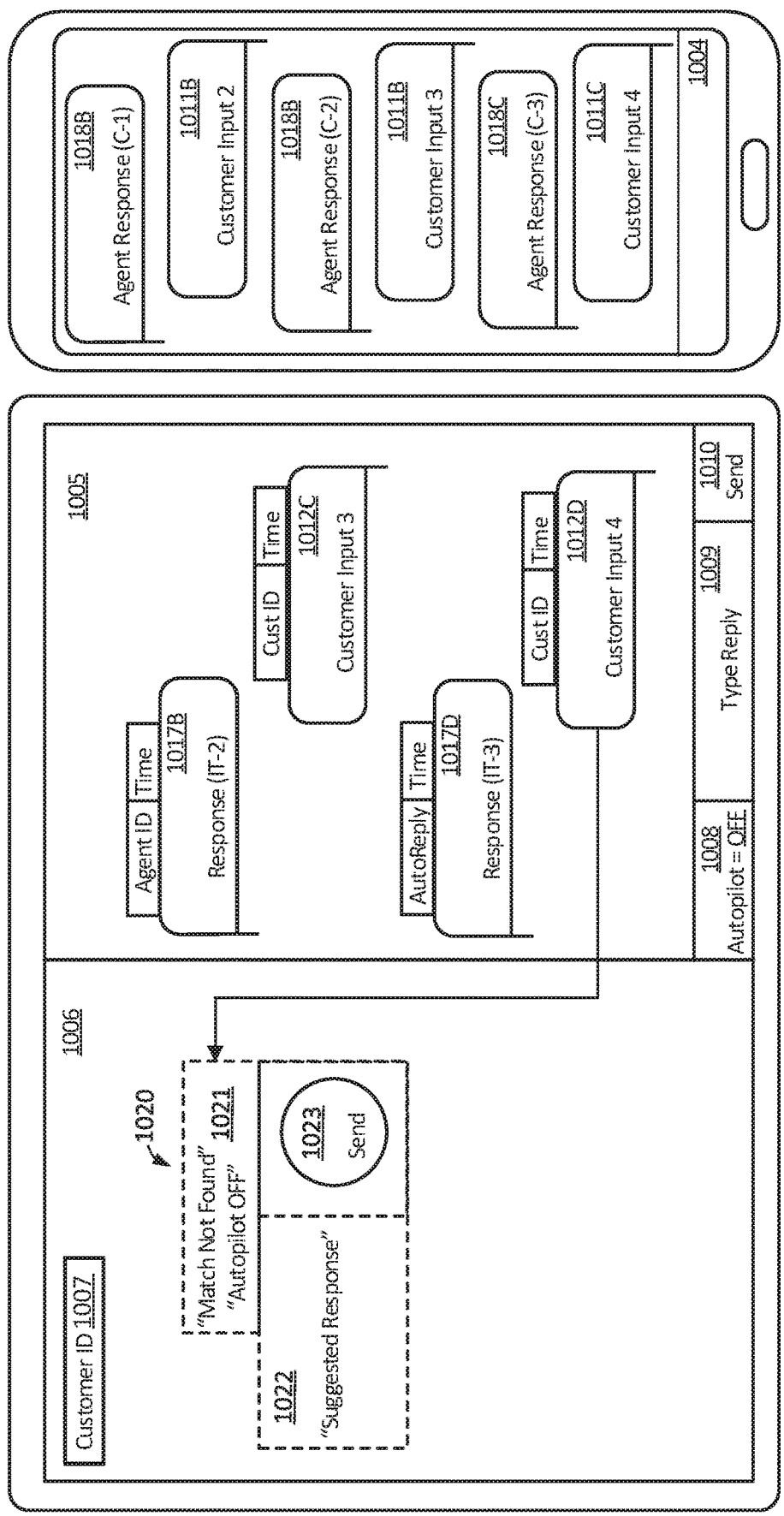
FIG. 10-L

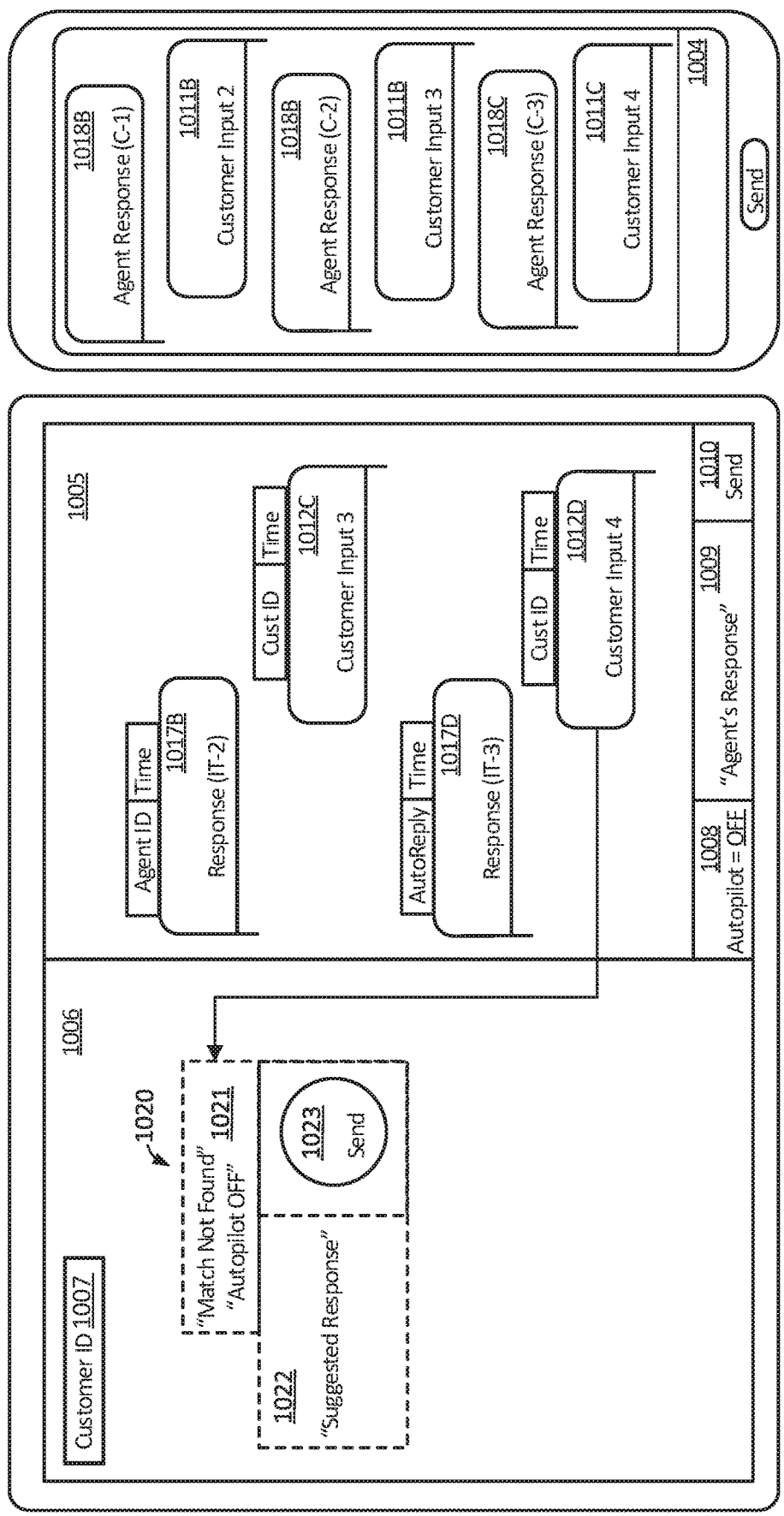
FIG. 10-M

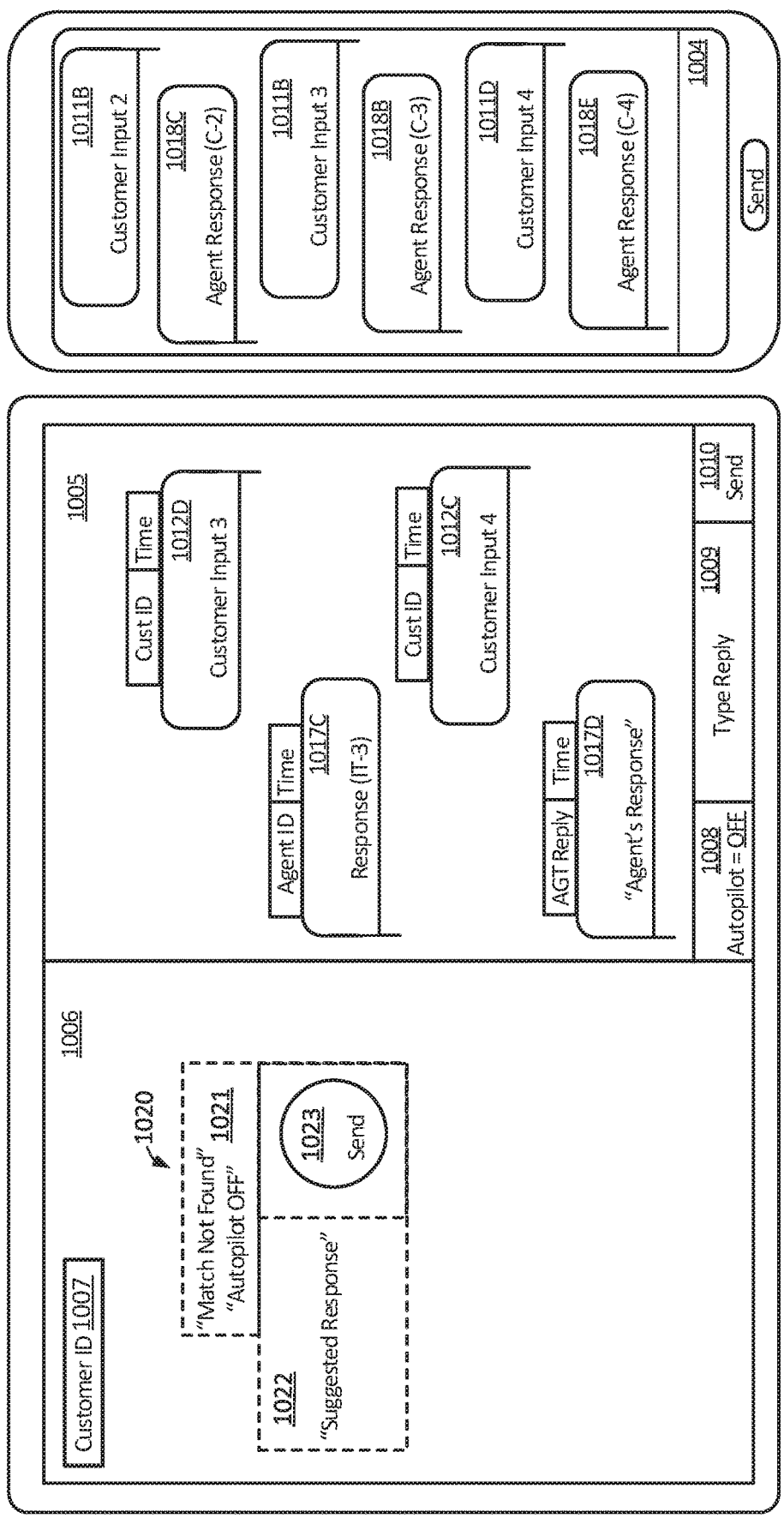
FIG. 10-N

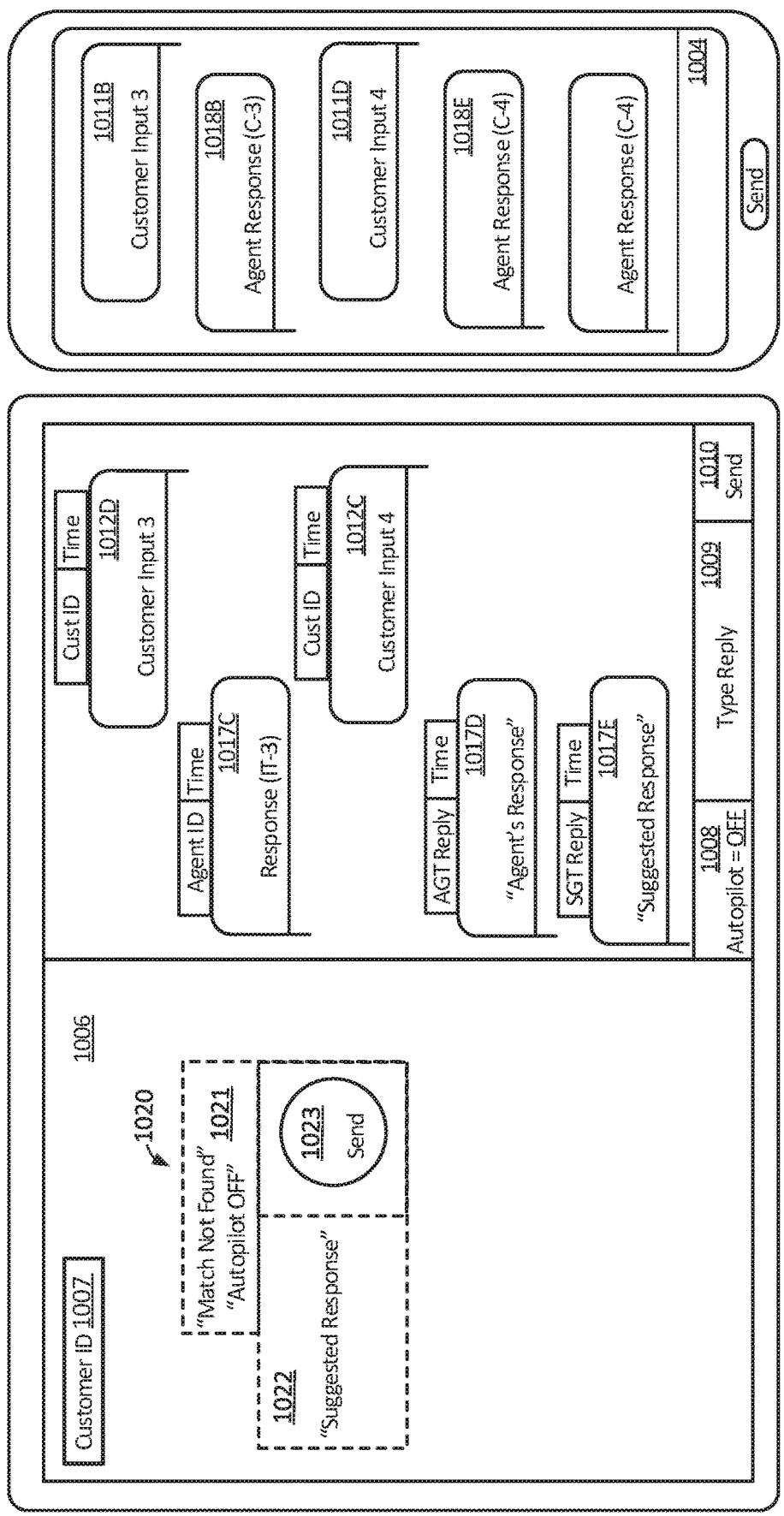
FIG. 10-O

SYSTEM AND METHOD FOR CHATBOT CONVERSATION CONSTRUCTION AND MANAGEMENT

BACKGROUND

A "chatbot" is a computer program that simulates, as experienced by a user of an electronic communication device, e.g., a "smart phone" or laptop computer a conversation with a human being. One goal of a chatbot is to provide a pleasant experience for the user, for example, a quick resolution of a customer question, or quick provision of a requested service, e.g., a taxi cab. Another goal can be a business transaction, e.g., sale of a product or service.

Optimizing a chatbot to simulate human conversation can be challenging. Different businesses can have respectively different customers, each with particular needs and preferences. In addition, a challenge in optimizing the chatbot can be in tailoring the chatbot to match the natural language processing (NLP) engine being utilized. More specifically, due to high computational requirements of NLP, chatbots systems often utilize vendor-based NLP engines, for example, IBM Watson™, Amazon LEX™, or Google Dialogflow™. These NLP engines can have a plurality of dissimilar aspects, for example, in terms of data types and protocol, as well as their NLP algorithms. One result is that porting a chatbot system designed for one NLP engine over to another NLP engine can necessitate substantial re-design, and therefore substantial effort. In addition, the dissimilarities can make "A/B" testing between different NLP engines impractical.

Structuring of a chatbot conversation flow can have technical complexity, which can impose difficulty when an end user wishes to focus design resources on business-related, semantic aspects of the chatbot.

Chatbot systems may also experience "fallout," i.e., instances when the NLP algorithm does not succeed in matching the end user's utterance to an intent. Back-up techniques, such as asking the end user to re-phrase a question, may result in an unpleasant user experience. Similarly, a bad user experience may result when the NLP algorithm makes a wrong match. Without a continuous feeding/learning process to improve chatbot pattern matching, fallouts and wrong matches may re-occur, and user experiences may quickly deteriorate.

Further, the delineation between what is appropriate for a live agent to handle and what can be more efficiently handled by a chatbot is not a fixed boundary.

Accordingly, what is needed is a chatbot system and method not tied to a particular NLP engine, that can provide a continuous self-improvement to reduce fallout and improve accuracy, and also provide efficient allocation and hand-off of tasking between chatbots and live agents.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a screen shot of one exemplary graphical arrangement of a user interface form, for receiving alternative end user expressions for an example intent, in one implementation of a process for chatbot conversation structuring and management according to various aspects.

FIG. 3 is a screen shot of one exemplary chatbot response, configured with a particular social media protocol, in one implementation of a process for chatbot conversation structuring and management according to various aspects.

FIG. 4 is a screen shot of one exemplary chatbot response, configured with another particular social media protocol, in one implementation of a process for chatbot structuring and management according to various aspects.

FIG. 10-A through FIG. 10-O are screen shots showing, in a snapshot sequence, features and exemplary operations in one process for agent chatbot assistance according to various aspects.

DETAILED DESCRIPTION

In the following detailed description, numerous details are set forth by way of examples in order to provide a thorough understanding of the disclosed subject matter. It will be apparent to persons of ordinary skill upon reading this description that various aspects can be practiced without such details.

Systems and methods disclosed herein can provide, among other technical features and benefits that will be appreciated by persons of ordinary skill upon reading this disclosure, the capability to readily construct a variety of chatbots, personalized by the chatbot system user to the system user's particular needs, and to the needs and preferences of the system user's customers, without detailed knowledge of natural language processing (NLP), and without being tied to any particular NLP engine. Systems and methods disclosed herein can also provide, as a further feature of being readily personalized by the chatbot system user, a two-level personalization, wherein the system user's information technology (IT) personnel, can construct a plurality, e.g., a library of re-usable frameworks by which the user's marketing, and/or customer assistance personnel can build, and tailor, chatbot conversations, without detailed knowledge of NLP.

Systems and methods disclosed herein can also provide, among other technical features and benefits, capability of improved bot training, through particular monitoring and subsequent exploitation of chatbot fallout, and of end user feedback, to continually improve chatbot performance— including speed and efficiency of the chatbot in task accomplishment, and end user experience.

Systems and methods disclosed herein can also provide, among other technical features and benefits, a step-in chatbot assistant for live agents. The step-in chatbot assistant can bring machine learning to help improve agents' accuracy in responding to customer queries, and can significantly shorten agent response time, with operations transparent to the customer and convenient for the live agent.

Figure 1:
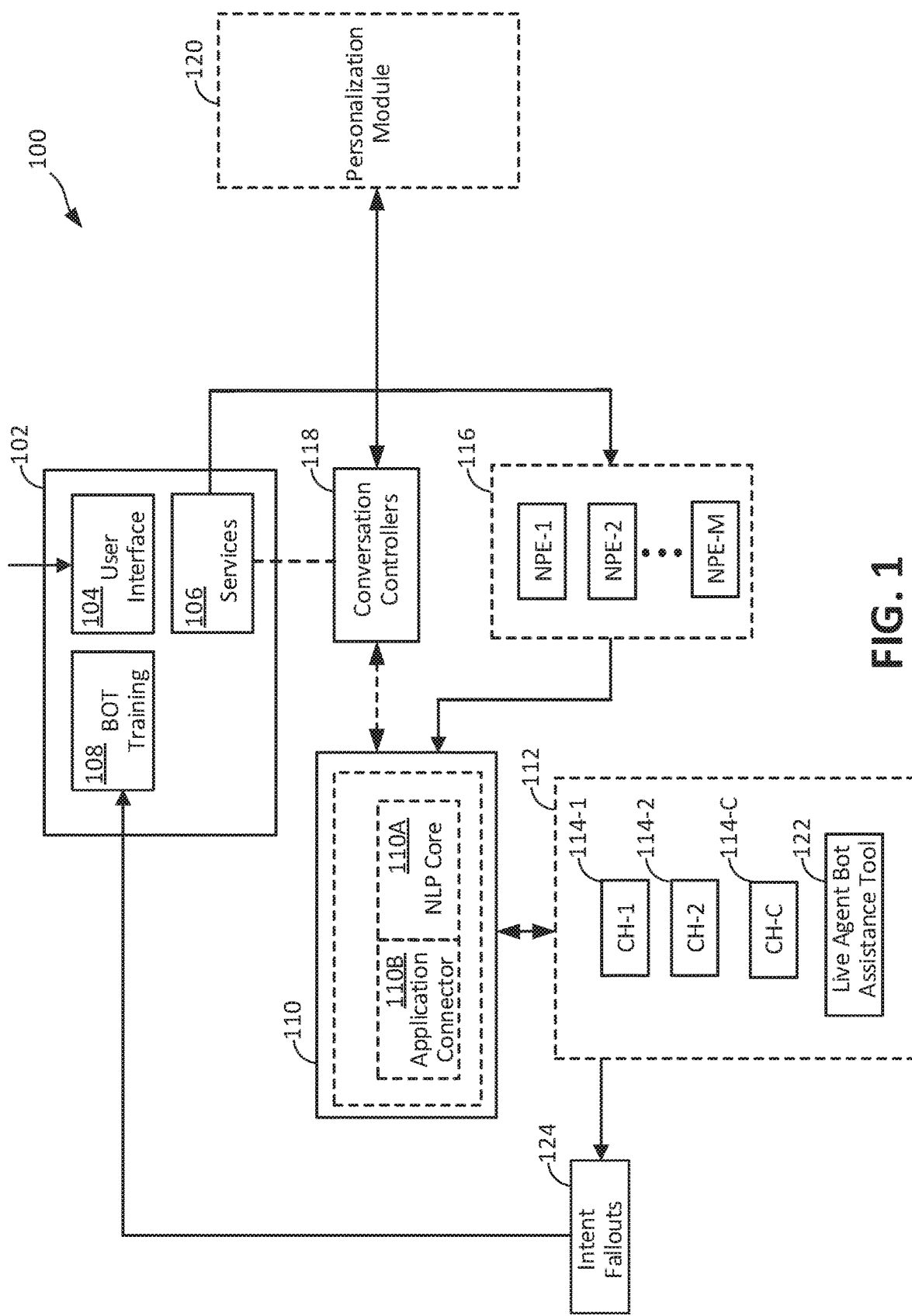
FIG. 1 is a functional block diagram of one exemplary implementation of one chatbot conversation structuring and management system according to various aspects.

FIG. 1 is a functional block diagram of a system 100, which is one exemplary implementation of one chatbot conversation structuring and management system according to various aspects. It will be understood that the FIG. 1 blocks are graphical representations of logical functions, arranged for visibility and convenience in description and, except where expressly stated otherwise or made clear from a particular context, neither the blocks nor their arrangement are intended as any representation of any particular allocation, distribution, or grouping of functions to particular hardware.

The system 100 can include AI Manager/Conversation Construction and Management platform 102, configured with a chatbot system user interface 104, and a services module 106. The AI Manager/Conversation Construction and Management platform 102, for brevity, will be alternatively referred to by abbreviation as "AI Manager 102." The AI Manager 102 can also include a bot training improvement module 108, which is described in greater detail in later sections of this disclosure. The AI Manager 102 can be coupled to an artificial intelligence (AI) connector platform 110. The AI connector platform 110 can include an NLP core 110A and Application Connectors 110B. Features of the NLP core 110A of the AI connector platform 110 can include a library of interfaces and protocol translation applications, for each of the different NLP engines. In an aspect, the interfaces and protocol translation applications provided by the NLP core 110A can be configured to present chatbot conversations with a generic interface that conversation controllers, such as the conversation controllers 118 described later in greater detail, can consume without consideration of which NLP engine is being applied. The Application Connectors 110B can provide interface, for example, through a channel integration platform 112, to one or more chatbot channels, such as a customer browser accessible web site CH-1, numbered 114A, or a social media page CH-2, numbered 114B (e.g., a Facebook™ page), or other messaging account CH—C, numbered, 114C (e.g., Twitter™), collectively referenced herein, for brevity, as "chatbot channels 114." Features of the application connectors 110B can include provision of a middle-tier layer to account for channel specific nuances, e.g., various particularities of different chatbot channels 114. From a technical user's perspective, Application Connectors 110B can be tools for front-end integration, and the NLP core 110A can be a tool for backend integration.

The web site 114A, social media page 114B, messaging account 114C, and any other of the chatbot channels 114 can be associated with an owner of the system 100 or owner of information content or services(s) provided or made available through the system 100, or both.

Referring to FIG. 1, in an implementation, the AI connector platform 110 can interface, for example, through an NLP plug-in 116, to one or to a plurality of "M" NLP engines, M being an integer. FIG. 1 shows examples of such NLP engines labeled NPE-1, NPE-2, . . . NPE-M (collectively referenced herein, for brevity, as "NPEs"). One or more of the NPEs can be third party vendor services, for example, IBM Watson™, Amazon LEX™, or Google Dialogflow™. These and other NPEs can have a plurality of dissimilar aspects, e.g., in terms of their input-output protocol, their respective NLP algorithms, and other aspects. Technical features of the system 100, enabled and provided, for example, by its Application Manager/Conversation Construction and Management platform 102, AI connector platform 110, and NLP plug-in 116, can include solutions to the issue of NPEs having dissimilar aspects. For example, these and other components of the system 100, and their respective features and capabilities as described, can include receipt of natural language (NL) search data, e.g., end user text, from the chatbot channel 114 and, irrespective of the dissimilar aspects of different NPEs, format the NL search data into the required input protocol of the selected NPEs. In addition, the AI connector platform 110 can be configured to receive an NPE response from the NPE to which the NL search data was sent, and convert that response to a protocol for sending to the customer on the chatbot channel 114. In addition, the NPE response can include the matching intent, and a measure of the confidence of match found by the NPE, as will be described in greater detail in subsequent sections.

The AI Manager 102 can be configured to provide, on the chatbot system user interface 104, for entry (not separately shown in FIG. 1) of intents and, associated with each intent, a response, and customer expressions for the intent. One example of an intent can be "Need Hotel," for which a response can be a request to the customer for hotel booking parameters, e.g., location, date(s), price range, brand preference, and so forth. Customer expressions for intent "Need Hotel" can include, for example, "I need to stay tonight in Chicago," and "I need accommodations for four, tonight, in San Luis Obispo." Either the NPE, or the NPE plug-in 116, appropriately configured processing resources of the AI connector platform 110 can apply stemming to the customer expressions, The AI Manager/Conversation Construction and Management platform 102 can be configured to provide for construction and storage of a plurality of the conversation controllers 118 described above. In an implementation, the AI Manager 102 can be configured to provide for construction of conversation controllers as small blocks of re-usable business logic, of various types, that can be readily integrated into conversation trees, and that can provide a range of easy-to-use options for run-time flow control. The conversation trees can function and operate as a logic, and therefore can be alternatively referred to as "conversation tree logic."

One exemplary type of conversation controller 118, referenced herein for convenience as a "conversation flow controller," can control flow based on a condition, with control including run-time retrieval of information to determine whether the condition is met, and control of the aspects of the flow that can depend on that determination. One general example conversation flow controller 118 can provide flow control based on an authority level or classification of the end user. A more specific example of such a conversation flow controller 118 can be one, usable in a domain of or pertaining to accounting, providing conversation flow that is determined, at least in part, by whether the person conversing with the bot is for example, an account manager or an account owner. Configuration of such a conversation flow controller 118 can include a functionality of looking up the person's role using, for example, authentication information obtained earlier in the dialogue.

Another exemplary type of conversation controller 118 can provide a run-time look up and injection of data into the dialogue's response back to the end user. One example technical feature of a conversation controller 118 of this type can include capability of direct, e.g., via IT backend path, access to the requested data. Such a conversation controller 118 can be configured with a direct access, for example, to certain accounting information, such as but not limited to total balance due. Configured as such, if an end user asks an amount of money currently due to the business entity associated with the bot, the conversation controller 118 may directly look up the amount and respond back, for example, with "Your bill is $200."

Another exemplary type of conversation controller 118 can provide a business logic functionality, for example, a capability to make a sale, or to upgrade or downgrade a service plan or a subscription. As one specific example, in a chatbot conversation relating to a service plan upgrade, a last step can be actual submission of the upgrade to the service provider's plan implementation group. In an implementation, a conversation controller 118 of the business logic functionality type can be configured to perform the actual submission, and thereby complete the upgrade process.

In an aspect, the conversation controllers 118 can interface with a personalization module 120, having functionality by which the AI connector platform 110 can personalize the NPE response to a customer question or other customer intent. Features of the personalization module 120 can include storage of, or access to storage of, information particular to the customer using the system 100, e.g., customer authentication information, such as security questions and answers.

In another aspect, the system 100 can include the live agent bot assistance tool 122 which, as shown in FIG. 1, can interface through the channel integration platform 112 with the system's AI connector platform 110 and other component portions and sections. The live agent bot assistance tool 122 can interface, via these features of the system 100, with a customer assistance feature on a web site 114A, or on a social media page 114B, or can be reachable via a messaging account 114C associated with an owner of the system 100 or of information content or services(s), or both.

FIG. 2 is a screen shot of one exemplary graphical arrangement of a user interface form 200 for adding a user intent, and receiving alternative end user expressions for an intent, in one implementation of a process for chatbot conversation structuring and management according to various aspects. The form 200 can be displayed, for example, on a video display associated with the chatbot system user interface 104 of the conversation construction and management platform 102. The system user interface 104 can include, for example, a web interface that provides access to the form 200 by an Internet browser. In addition, or alternatively, the form 200 can be an application hosted by or installed on a server not readily accessible via the Internet, and displayed at a terminal connected to the server via, for example, a LAN.

Referring to FIG. 2, the form 200 can include end user intent field 201, that can hold a displayable version of a name assigned to an intent being created or edited. In the FIG. 2 example, the intent field identifies the current intent as "Tree.View_Bill." The Tree.View_Bill intent will be assumed, for purposes of example, as an intent by an end user to view his current bill, e.g., for a cellular subscription plans or a cable provider subscription. The form 200 can include an intent edit mode field 202 that can hold an indicator of the particular aspect, or feature of the intent that is being created or modified using the form. In the FIG. 2 example, the intent edit mode field 202 displays "v User Expressions," which indicates the aspect being created or modified is a training set of end user expressions for the instant intent, i.e., Tree.View_Bill. The field 202 may, but does not necessarily include a click change mode functionality, for example, a pull-down having a list of intent edit modes. The form 200 can include a training string text input field 203, in which a chatbot system user can type an end user expression, and an "Add" button 204 that the system user can activate, e.g., click on, to effect entry of the field 203 content into the training string list 205. The FIG. 2 example shows the chatbot system user having entered a list of several alternative expressions for the Tree.View_Bill intent. In an aspect, the form 200 can include a "Save" button 206, for a system user to save changes made in a current edit session. The form can include a "Delete" button 207. The button 207 can be configured, for example, to delete the entire intent or, in an aspect, to delete the current changes. The form 200 may include a "Fall Back Intent" switch 208. This switch configures the conversation to route to this intent if the user's question was not understood at this scope in the dialog. As an illustrative scenario, it will be assumed the form 200 Fall Back Intent switch 208 is set at "Yes," and that the fallback intent, for the billing dialog intent defined by the example form 200, is a request for the customer to rephrase the question. In such a scenario, if the end user mistakenly types: "I want to bay my bii" instead of "I want to pay my bill." If "Fall Back Intent," the conversation can be directed to the fallback intent, i.e., a request to the end user to rephrase the question.

FIG. 3 is a screen shot of one exemplary chatbot response payload configuration, structured according to a particular social media protocol, in one implementation of a process for chatbot conversation structuring and management according to various aspects. The configuration 300 is a Facebook payload. Referring to FIG. 3, the configuration 300 can include a social media or channel identifier field 301 content "FB," indicating Facebook™, and a payload field 302 having a content configured in accordance with that channel.

FIG. 4 is a screen shot showing a portion of one example chatbot response payload configuration 400, having a content of the field 302 configured as a Twitter™ Direct Message payload, and having in field 301 a channel identifier "TW" identifying that channel.

Figure 5:
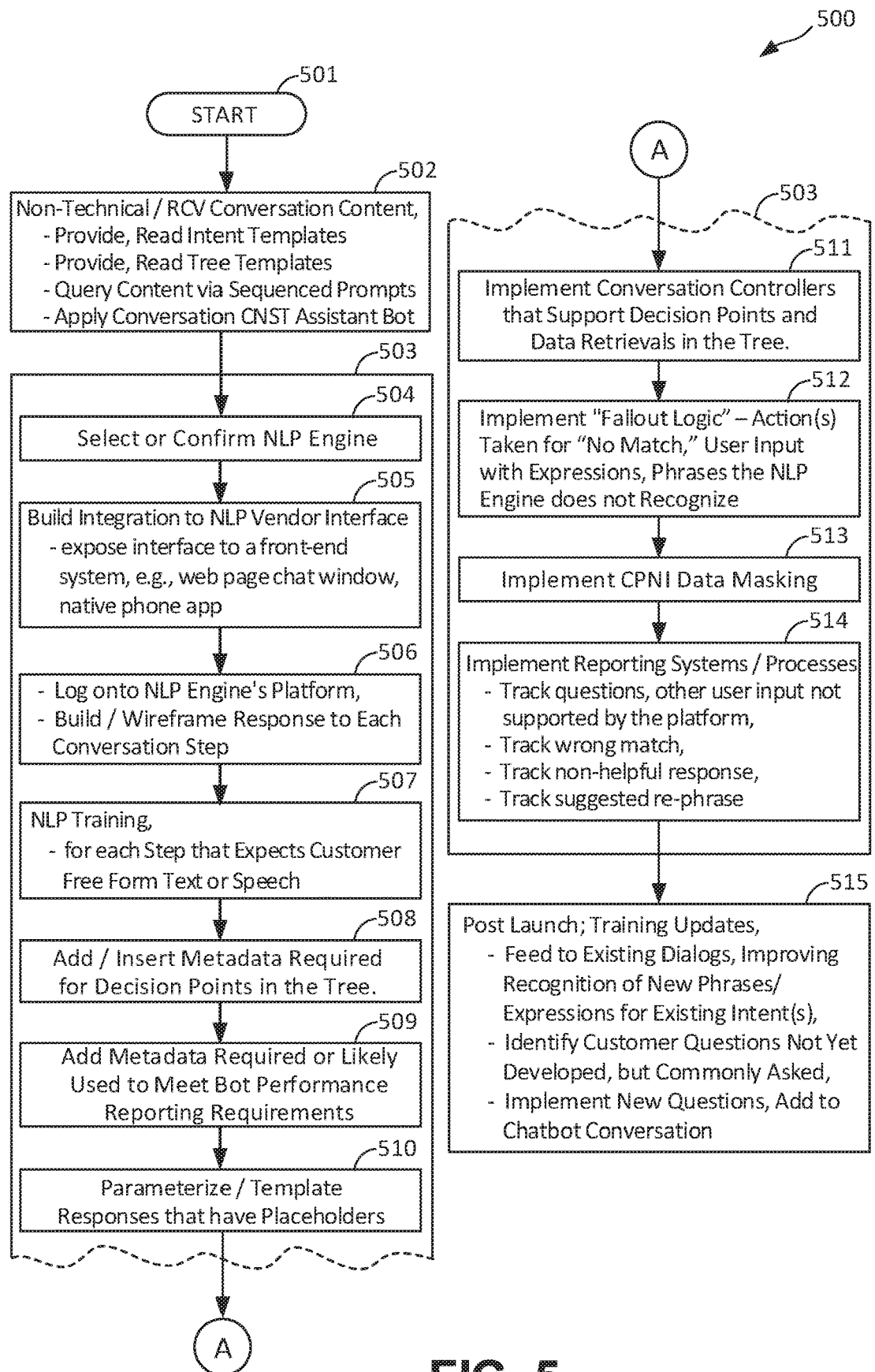
FIG. 5 is a logical flow chart of exemplary operations in one implementation of a process for chatbot conversation structuring and management according to various aspects.

FIG. 5 is a logical flow chart of exemplary operations in one implementation of a process 500 in a chatbot conversation structuring and management, in systems and methods according to various aspects. An example instance of the process can begin from a start state 501, with receiving, at 502, a desired chat conversation flow. The receiving at 502 can be configured, for example, with graphical user guides or templates. For example, one graphical template can include a start box for entry of an end user intent that initiates the conversation, and a start chatbot response box for entry of same. As an example, if the conversation is for a moving service, the entry in such a start box could be: <"can you move a household content from [CITY, STATE] to [CITY, STATE]?">. The graphical template can also include a start chatbot prompt box, such as <"1 see that you may be looking for a moving service. If you are, tell me and perhaps I can help">. The graphical templates can include blocks for entering a conditional response to an end user intent. For example, using the moving service example above, one example entry to a such block can be <If user indicates [YES], "please tell us when you would like to move">. The graphical template can also include, for example, in the blocks for entering an end user intent, a starting set of verbal expressions that end users might use to express the intent.

In another example implementation, operations applied at 502 can include system prompts to assist in entering the conversation. In another example implementation, operations applied at 502 can provide for non-technical persons to input the desired conversation via structured forms, for example, fillable pdf forms.

Referring to FIG. 5, in one example instance, upon input of the desired chat conversation, the flow 500 can proceed to a technical operation mode 503. Example operations can include assignment at 504 of an NLP engine. Assignment at 504 can be based on the type or intended context of the conversation entered at 502, and alternatively or additionally based on other factors, e.g., comparative testing of different NLP engines or performance history of one or more of such engines, or both. It will be understood that come instances of the 500 can omit 504.

Operations applied at 505 can include building an integration to the assigned NLP engine's interface. Such operations can include, for example, exposing an interface to a front-end system, such as a chat window in a web page or a native phone app. In an aspect, operations that can be applied at 506 can include logging onto a selected NLP platform, and applying operations of building or wireframing the conversation tree. Operations applied at 506 can include populating the text responses for each step in the conversation. Exemplary operations that can be applied at 507 can include NLP training, for example, for each step that expects the end user to enter free-form text input, or free form text conversion of verbal input. Operations can be applied at 508 to add or insert metadata required for decision points in the tree. To illustrate, in the description above of conversation controllers of a type to control flow based on a chatbot end user's (e.g., customer's) role, a presented example is a hypothetical control of a flow dependent, at least in part, on whether the user is an account owner or an account member. Operations applied 508 can include insertion of metadata for such types of conversation controllers.

Continuing to refer to FIG. 5, operations can be applied at 509 to add metadata, for example, that may be required, or otherwise used for reporting requirements. In one or more implementations, operations can be applied at 510 to parameterize/template responses that have placeholders, for example, "Your bill is $AMOUNT dollars." In an aspect, operations can be applied at 511 to implement conversation controllers that support decision points and data retrievals in the tree. In an implementation, operations can be applied at 512 to implement "fallout logic, meaning an action or actions taken in the event an end user communicates verbiage to the chatbot system that the NLP engine cannot recognize.

In an implementation, operations can be applied at 513 to implement Customer Proprietary Network Information (CPNI) data masking, or masking of any identified confidential information, to protect against third party receipt of sensitive information. In addition, operations can be applied at 514 to implement reporting systems and processes, with functionalities such as tracking questions or other input from end users that is not supported by the platform, or were wrongly matched. In an aspect, such functionality can include obtaining and recording user feedback, enabling a continuing training and updating loop. Features and aspects of such reporting systems, methods, and implementations thereof, and various updating and training process that can exploit the reporting, and can provide various additional features and benefits, are described in greater detail below.

Implementations can include various post-launch operations 515. Operations at 515 can include training updates, which can be fed to existing dialogs for improvement in recognizing additional expressions of the same intent, e.g., additional ways and variations of ways that customers ask a question. Operations at 515 can also include identifying customer questions that were not developed, but are being commonly asked, and then implementing them, e.g., adding them to the chatbot conversation.

In operations of chatbot systems and methods according to this disclosure, there can be instances where the NLP engine does not match an end user's utterance or text to any intent the NLP engine has been trained to recognize. There can be various causes. One can be the end user's (i.e., customer's) actual intent not matching any in the NLP engine's knowledge base. Another cause can be the end user, although expressing an intent the NLP engine has been trained to recognize, doing so with a phraseology sufficiently different from the NLP engine's training set that the expression is not recognized. The result of these and other causes can be the same: a bad user experience.

Systems and methods disclosed herein can provide, among other features, automatic reduction of these and other bad user experiences. Features can include continuous fallout detection and monitoring, and other negative bot outcome monitoring, and recording, and automatically apply chatbot training utilizing that monitoring and its recordings. Technical features include an inherent and automatic improvement, in the course of the chatbot system operation, in system metrics such as NLP engine performance, e.g., reduction of wrong matches; non-helpful responses; and other incidences that can cause end users to have bad experiences. Particular features can include, in instances where the NLP engine finds no matching intent, requesting the end user to re-phrase the question or statement. In addition, implementations of disclosed chatbot systems and methods can be configured to present sample questions to an end user for the purpose of assisting the user in rewording the question. Features can also include storing the fallout event, for example, as an entry in a fallout record or bucket, which can include the end user's originally worded question, and can include other incident-related facts, e.g., characteristics of the end user. Implementations can also provide particular analyses of the fallout record, including machine learning processes. For example, implementations can provide fallout clustering, categorization of clusters into domains and intents, and incorporation back to an existing intent or dialogue tree, enabling a continuous learning process within the chatbot.

Figure 6:
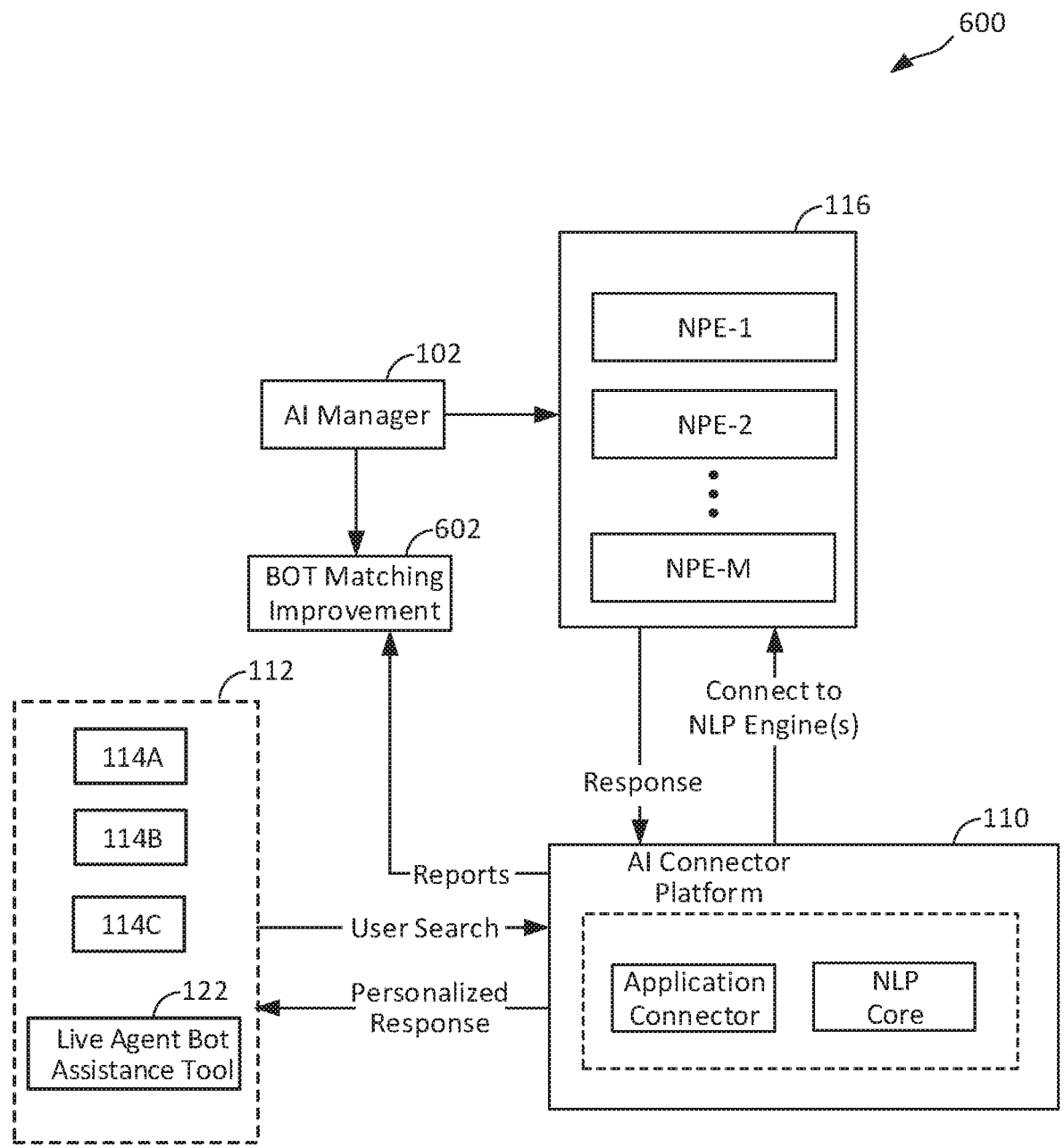
FIG. 6 is a functional block diagram of one exemplary implementation of one system for chatbot training Improvement according to various aspects.

FIG. 6 is a high level functional block diagram of one example implementation of an improved training chatbot system 600. Referring to FIG. 1 and FIG. 6, the system 600 is shown in the context of the FIG. 1 system 100. The system 600 provides features including the above-described automatic monitoring and reporting of fallout and rephrase suggestions, and of user experiences, for example, via feedback reports. Features also include automatic training, which can include, among other aspects, a clustering of fallouts back to the NLP engine, for continuous improvement in accuracy, increase in number of recognizable user expressions, and addition of new recognizable intents. Referring to FIG. 6, system 600 can include a Bot Matching Improvement logic 602 that is configured to receive reports from the AI connector platform 110. The reports can include the reports of fallouts, re-phrase suggestions, and user experience feedback reports, as described above. Functionality of the Bot Matching Improvement logic 602 can include the above-described clustering of fallouts and automatic training of the NLP engine's algorithm for providing the chatbot conversation. Example processes and operations of the clustering and automatic retraining are described in greater detail in reference to FIG. 7 and FIG. 8, and elsewhere in subsequent paragraphs of this disclosure.

Referring to FIG. 6, an end user (i.e., customer) search can be communicated from a customer to the AI connector platform 110, for example, by the customer visiting a web site of the owner of system 100, clicking on a chat window, and entering a question. The entered text can be the end user search illustrated in FIG. 6. The AI connector platform 110, in response, can connect to a selected one of the NLP engines (e.g., of NPE-1, NPE-2, . . . NP-M) to which the platform 110 can interface through the NLP plug-in 116. The AI connector platform 110 can be configured to transform the end user search into a format acceptable to the selected NPE. In an aspect, the AI connector platform 110 can also apply stemming processing to the end user search, prior to sending it to the NLP plug-in 116. In another aspect, the AI connector platform 110, in combination with logic provided by the live agent bot assistance tool 122 can communicated the end user search to a live agent display associated with the tool 122. Example processes and operations of the live agent bot assistance tool 122 are described in greater detail in reference to FIG. 9 and FIG. 10-A through FIG. 10-O, clustering and elsewhere in subsequent paragraphs of this disclosure. The selected one of the NLP engines NPE returns a result of its searching for an already extant intent. If the result is a matching intent, the AI connector platform 110 sends the intent that matches the end user search.

The AI connector platform 110 can be configured to apply a stemming processing to the user search prior to sending it to the NLP plug-in 116.

Figure 7:
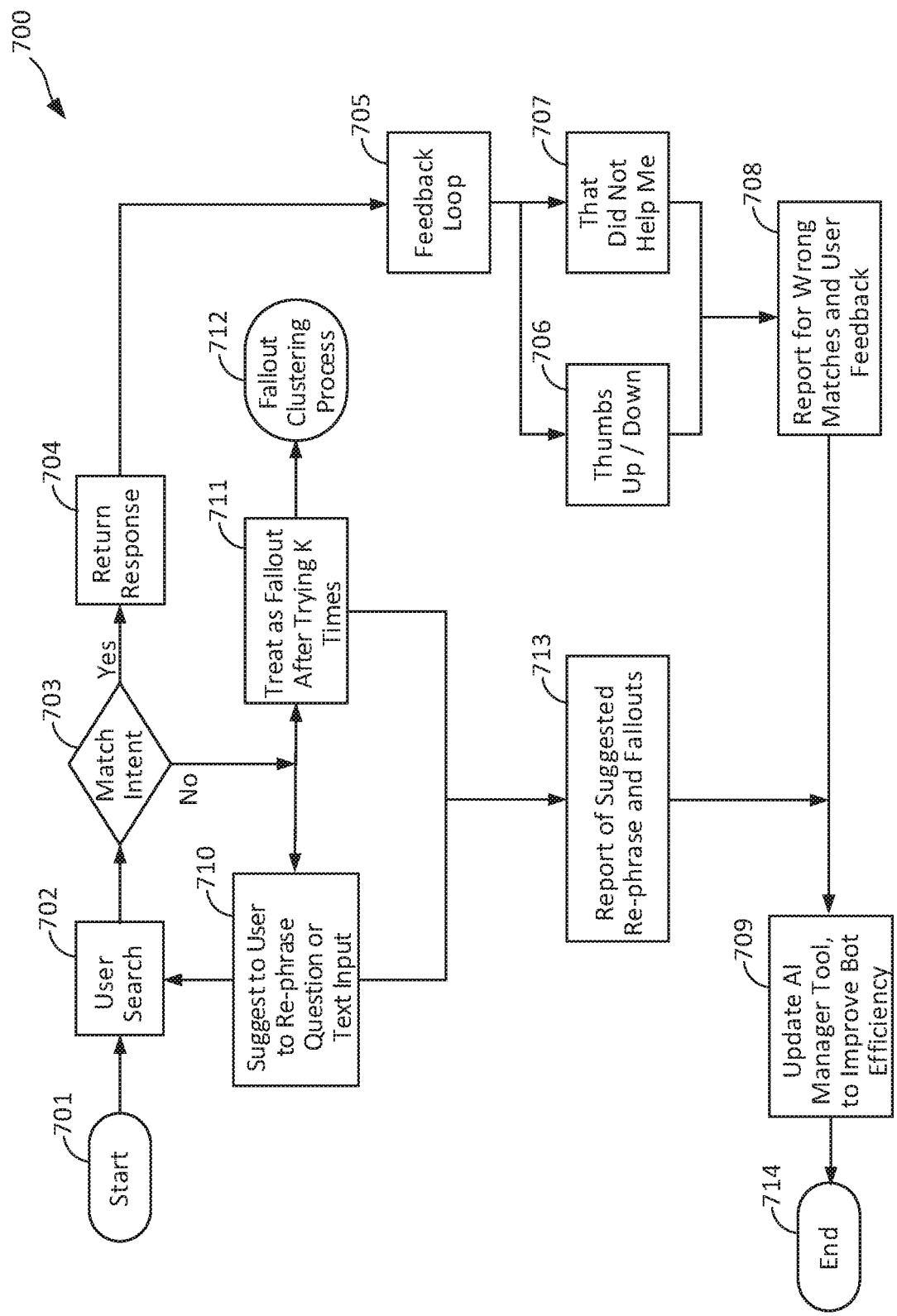
FIG. 7 is a logical flow chart, showing exemplary operations in an implementation of a process of collecting records of fallouts, wrong matches and other negative user feedback, for subsequent fallout clustering and AI manager updating, in one or more systems and methods for chatbot training improvement according to various aspects.

FIG. 7 is a logical flow diagram, showing exemplary operations in one implementation 700 of a process of collecting records of fallouts, wrong matches and other negative user feedback, for subsequent fallout clustering and AI manager updating, in one or more systems and methods for chatbot training Improvement according to various aspects. Some examples of operations will be described in reference to FIG. 6. Description assumes a chat conversation has been constructed and is accessible by the NLP core 110A of the AI connector platform 110, and includes conversation controllers 118 and interfacing with the NPE, and assumes the NPE has been trained with at least a starting set of alternative end user expressions for each of a plurality of user intents.

In an example instance, operations can start at 701 with an end user's initiation of a chat by entering 702, a first expression of an intent. Initiation at 702 can be, for example, the end user's first entry of a text into a chat window on a web site associated with the system 100. The end user may have entered the text, for example, in a fixed chat window. As another example, the web site may have detected an end user's action, such as a click pattern, or the end user's browser history, as indicating a chat session may be useful, and responded with a chat window pop-up. After 702, the system 100 can perform, at 703, a first search for a matching user intent. Referring to FIGS. 1 and 7, operations at 703 can include passing the end user expression, for example, by the AI connector platform 110, through the NLP plug-in 116, to an assigned one among the M NLP engines NPE-1, NPE-2, . . . NPE-M, whereupon the one NLP engine searches the expression for a matching intent. The specific search algorithm applied by the NLP at 703 can be NLP-specific. In an implementation, for example, for testing purposes, there can be assignment of more than one NLP engine, in which case operations 703 can pass the end user expression to all of them.

Description will first address the scenario of the search at 703 finding a matching intent. Associated with the matching intent will be its chatbot response and, at 704, the response can be transmitted for display on the end user's device. The format of the response can be according to the channel (e.g., particular social media, web page) carrying the chat conversation. For purposes of example, if the end user text input at 702 is among alternative user expressions for the FIG. 2 intent Tree.View_Bill entered in the training string list 205, and the chatbot response to that intent is the example chatbot text shown in the "Payload" field 302 of FIG. 3, operations at 704 can include transmitting that text, namely, "You can view, save and print . . . " and the web address for accessing the bill, (formatted according to the particular chatbot channel 114").

Upon operations at 704 communicating to the end user device the chatbot response to the matching intent, operations at 705 can initiate an end user feedback loop, to obtain user input regarding the user's experience. Operations at 705 can include, for example, sending to the end user device an inquiry regarding the user's opinion on the response sent at 704. Example forms for the inquiry can include, but are not limited to, a binary type, e.g., "Thumbs Up/Thumbs Down" or similarly worded pair of checkboxes. User response to that inquiry can be received at 706. Operations in response to a negative response can include instantiating a "wrong match" entry, and storing it, for example, in a wrong match record. Content of the wrong match entry can include, for example, the end user expression entered at 702, and the match found at 703. Content of the wrong match entry may also include an end user identifier or other data unique to an end user. Sources for such information can include, for example, the conversation controller(s) 118 that relate to the block in the dialogue tree at which the NLP engine found the wrong match.

Referring to FIG. 7, one alternative or supplement to the above-described "Thumbs Up/Thumbs Down" user experience query form can include a "That Did Not Help Me" query. Such a query can be configured as a checkbox or as a text entry field, or both. User response to the "That Did Not Help Me" query can be received at 707, and operations in response to a negative response can include, for example, instantiating and storing a "non-helpful match" entry. The non-helpful match entry can be stored, for example, in a non-helpful match record. The non-helpful match entry can be implemented, for example, similar to the wrong match entry described above. The non-helpful match entries can be configured to store additional information describing, or providing a finer-grained classification for, the user's negative experience.

In an implementation, operations at 708 can generate a wrong match report, a non-helpful match report, or both, and deliver the report(s) to an update AI Manager tool 709. Aspects and features of the update AI Manager tool 709 will be described in greater detail later in this disclosure. Assuming both a wrong match report and non-helpful match report, these can include, respectively, the above-described wrong match record and non-helpful match record. The report can include extractions or portions of the wrong match record and non-helpful match record. Operations at 708, in an aspect, can generate and deliver the wrong match reports, or non-helpful match reports, or both, based on a schedule. As an alternative or supplement, operations at 708 can send wrong match reports, or non-helpful match reports, or both, to the update AI Manager tool 709 in response to a counting of one or both of the above-described wrong match entries and non-helpful match entries. In an aspect, the system 100 can also provide for active query, for example, of the non-helpful match record, the wrong match record, or both.

Referring to operations at 703, upon the NLP search finding no match, operations can include sending, at 710, a suggestion to the end user's device for the user to re-phrase the statement or question that was input previously at 702. Search operations by the NLP can then be performed again at 703, this time using the re-phrasing. If this search at 703 finds a match, the above-described operations for the scenario of an initial match at 703 are performed. In an aspect, each loop, i.e., a question entry, at 702, followed by a no match at 703 and suggested re-phrasing at 710, can also increment, at 711, a loop termination counter. In an implementation, the loop termination counter can be configured with a "K" attempt limit, "K" being an integer. In such a configuration, when the number of attempts at 711 meets (or exceeds, depending on specific implementation) the loop termination counter limit K, operations can include identifying the attempts as an incidence of fallout and, at 712, providing information on the fallout incident to a fallout clustering process. Implementations, exemplary features, and aspects of fallout clustering processes according to the present disclosure are described in greater detail in later sections. In one or more implementations, performance of the fallout clustering processes, or portions thereof, can be an aspect of the update AI Manager tool 709 identified above.

Referring to FIG. 7, operations can store, at 713, records of the above-described suggested re-phrasings and fallout incidences. Operations at 713 can also generate suggested re-phrasing and fallout reports, and deliver the reports to the Update AI Manager tool 709. Operations at 713 can be configured to generate and deliver the suggested re-phrasing and fallout reports based, for example, on a schedule, or on a counting of the suggested re-phrasing incidents, or a counting of the fallout incidents, or any combination thereof. The system 100 can also provide for active query of the above-described record of suggested re-phrasings and fallout incidents.

In an implementation, systems and methods can provide updating of the AI Manager 102, based on end user feedback, such as provided by the wrong match reports, or non-helpful match reports, or both, described above in reference to FIG. 7. Features and benefits of the updating can include improvement in bot performance, for example, improved accuracy of pattern matching. Systems and methods can provide updating of the AI manager tool based on a matching efficiency indicator, for example, the re-phrase reports described above. Systems and methods can also provide initiating the Update AI Manager tool 709 based on fallout incidences, for example, in response to fallout reports generated at 713, and fallouts provided to the clustering process at 712.

In an aspect, operation of the Update AI Manager tool 709 can include sending of feedback reports, such as the above-described wrong match reports, or non-helpful match reports, or both, back to the AI Manager 102, or can include fallout clustering back to the AI Manager 102 of the above-described reports of suggested rephrases, or clustering back of all of these reports. Operations in the clustering back can include application to the reports of various machine learning algorithmic steps, then clustering the reports back into domain buckets. The obtained clusters can then be added back to the AI manager tool, for example, into various intents. In an aspect, a "clean-cluster" quality metric can be determined for the clusters, and those that meet a clean cluster threshold can then be mapped to a domain, or an intent, or both. The mapping can apply, for example, a combination of predictive algorithms. The mapped clusters can then be added back to the AI Manager 102, for example, into various intents. In an aspect, the feedback reports (e.g., wrong match reports, non-helpful match reports, or suggested re-phrase reports, or any combination thereof) can be generated again and compared with the previous iteration after adding of the obtained clusters. This process can be repeated multiple times. Features and benefits can include, but are not limited to, improved speed and accuracy of the bot's pattern matching, enlargement of the bot's recognition vocabulary and, in an aspect, addition of new intents, thereby reducing fallout, request for re-phrasing, and other flow interruptions and, accordingly, providing smoother chatbot conversation flow.

In an implementation, the above-described cluster back process can also be applied to a bot matching process, because many, if not essentially all, end user search patterns can be classified using this cluster back process. Features and benefits can include, but are not limited to, long term improvement of the original classification.

Figure 8:
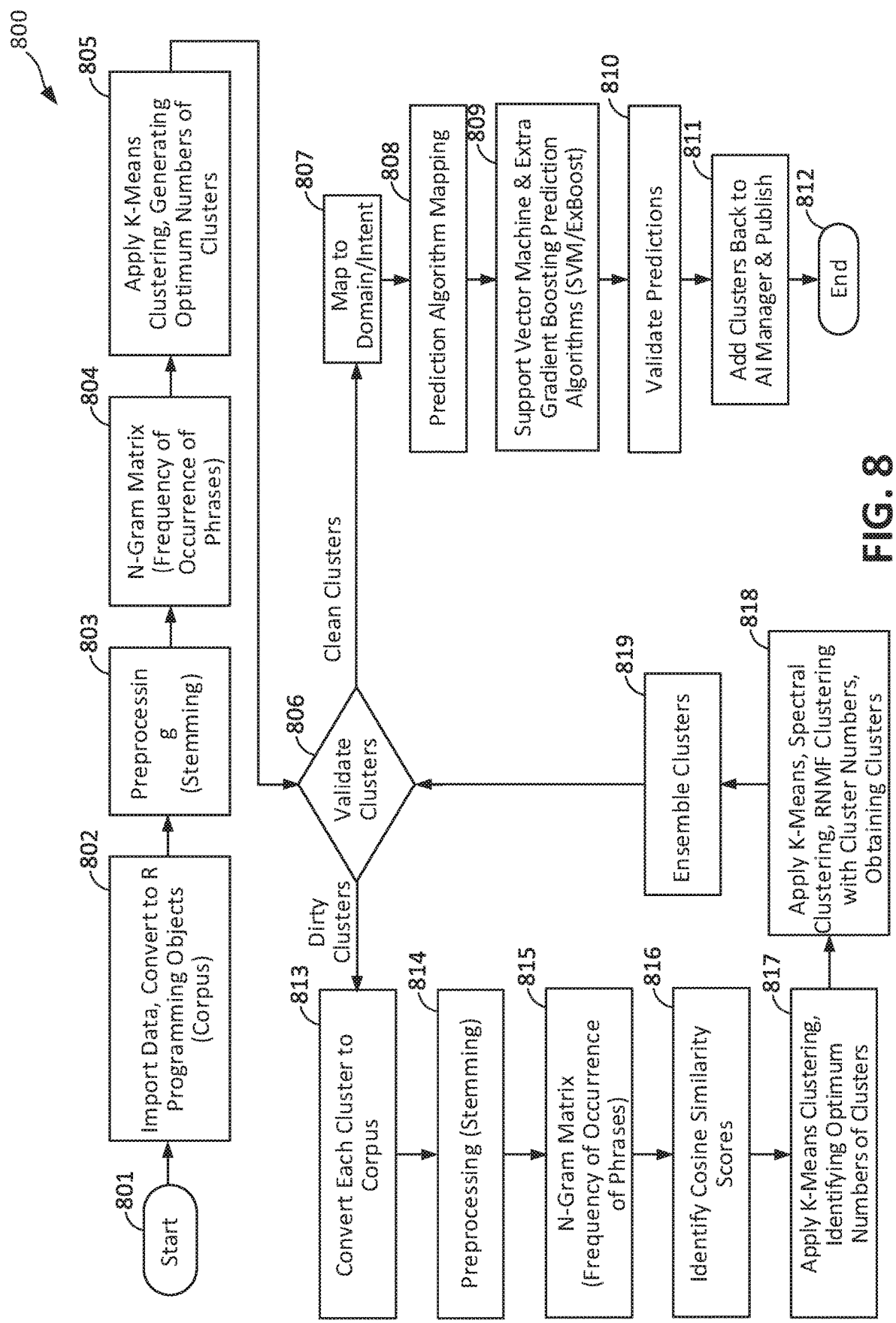
FIG. 8 is a logical flow chart, showing exemplary operations in an implementation of a process of end user search pattern clustering, in one or more methods for chatbot training according to various aspects.

FIG. 8 is a logic block diagram, showing exemplary operations in one implementation 800 of a process of end user search pattern clustering, in one or more methods for chatbot training according to various aspects. An instance can start from an arbitrary start 801, and then operations can, at 802, import bot performance data, for example, any one of, or any combination of, end user feedback (e.g., wrong match reports, non-helpful match reports), rephrase reports, and fallout reports. Operations applied at 802 can include conversion of the bot performance data into R programming objects, R being an integer. The R programming objects, for purposes of description, will be referred to as "the corpus." Pre-processing or stemming operations can then be applied to the corpus at 803, and the result used by operations applied at 804 in constructing an N-gram matrix. The N-gram matrix indicates the frequency of occurrence of a plurality of different N-grams in the stemming result. Operations applied at 805 can cluster the N-grams by applying, for example K-means clustering, and generating an optimum number of clusters. Operations can be applied at 806 that validate clusters output from 805. In an aspect, the validation can be based on a "clean cluster" metric. The clean cluster metric can correlate, for example, to absence of outliers or "noise" in the cluster.

Operations applied at 807 can map the clean clusters from 806 to domain/intent, whereupon operations at 808 can apply a prediction algorithm mapping. In an implementation, operations at 809 can apply another prediction mapping algorithm. Operations applied at 809 can include the Support Vector Machine and Extra Gradient Boosting Prediction Algorithm (SVM/ExGBoost). Then, operations applied at 810 can validate the prediction results from 809 and, upon validation, operations can be applied at 811 that add the clusters back to the AL Manager, and publish the results. The example instance of the clustering back can end at 812.

Referring to FIG. 8, above-described operations that follow the clean cluster validation operations at 806 were for validated clean clusters. For purposes of description, clusters that do not validate as clean will be referred to as "non-validated" clusters. These can be referred to, alternatively, as "dirty" or "noisy" clusters. In an aspect, non-validated clusters from 806 can be passed to 813 or accessed by 813, to apply operations converting the non-validated clusters back to a corpus. Pre-processing or stemming operations can then be applied at 814 to the converted corpus, and the result used by operations applied at 815 in constructing an N-gram matrix.

The N-gram matrix constructed at 815 is based on N-grams that did not form clean clusters in the above described operations at 806. Therefore, operations can be applied at 816 that assign a similarity score, i.e., a measure of similarity between vectors (e.g., rows) of the 815 generated N-gram matrix. Operations at 816 can output the similarity scores as a similarity matrix, to which operations at 817, configured for example as a K-means clustering algorithm, can be applied, and the output can identify an optimum number of clusters. Regarding the metric used at 816 to determine similarity, Euclidean distance is one such metric. However, due to the corpus generated at 813 being from non-validated clusters, the Euclidean distance between rows of the N-gram matrix generated at 815 can have characteristics. Accordingly, the cosine similarity can be preferred as the similarity metric at 816, as that metric can improve the performance of the K-means clustering algorithm applied at 817. Alternatives to the cosine similarity and the Euclidean distance can be used, and one example can be, but is not limited to, the Jaccard similarity. In such an implementation, operations at 816 would output a Jaccard similarity matrix. For brevity, description of features and operations in reference to FIG. 8 will assume cosine similarity. Description above referenced operations at 816 and operations at 817 separately. The operations applied at 816 and 817 can be grouped or combined, though, and accordingly can also be referred to as "spherical K-means clustering algorithm."

Referring to FIG. 8, using the cluster numbers generated at 817, clustering operations applied at 818 can cluster vectors of the N-gram matrix generated at 815. Clustering operations at 818 can include, for example, application of K-means clustering, spectral clustering, or Regularized Non-Negative Matrix Factorization (RNMF), or any combination thereof. The K-means clustering, or the RNMF clustering, or both, can use the cosine similarity matrix generated at 816.

Referring to FIG. 8, clusters formed by operations at 818 can be ensembled by operations applied at 819. In one or more implementations, operations at 818 and 819 can be collectively configured such that two or more different cluster algorithms are applied at 818, and their respective results ensembled at 819. For example, operations applied at 818 can be configured to cluster the cosine similarity matrix from 816 using K-means to cluster that matrix and using spectral clustering, and to then ensemble the K-means clusters and the spectral clusters, and assign intents to the results. More generally stated, in an implementation, operations applied at 818 can be configured to cluster the cosine similarity matrix from 816 using K-means, spectral, or RNMF clustering, or any combination or sub-combination thereof, and operations at 819 can be configured to ensemble the algorithms' respective clusters, and then assign an intent to clusters that result. In an aspect, operations at 819 can be configured to qualify the assignment of intent, for example, to assign intent only to clusters from the ensembling that meet a quality criterion (or criteria). Such operations at 818 and 819 may be referred to as a voting process that determines a highest number of votes and assigns an intent, i.e., a phrase, to the cluster.

In an aspect, clusters generated at 819 can be referred to as "potential clusters," that must be validated in order to be clustered back to the NLP engine of the selected NPE. An example validation criterion can be meeting a threshold level of "clean." As illustrated by FIG. 8, operations of such validation can be the above-described validation operations applied at 806. Potential clusters validated at this application of 806 can then be processed, starting with operations applied at 807 as described above. Potential clusters not validated at this application of 806, on the other hand, can be converted by another application of operations at 813, back into a new corpus. Implementations can include storing the new corpus, and building upon it using new clusters output from 805, but determined non- by 806, before repeating the above-described loop that starts at 814.

Technical features provided by processes according to 800, and the systems 100 and 600 enabling such process can include, but are not limited to, provision to the owners of the system 100 or information and services accessible through the system 100, or both, with a single portal, enabling seamless ownership and maintenance, for example, of content and dialogue trees. The content and dialogue trees can enable both customer self-serve and commerce functions. Features and benefits can also include automatic recording and mapping of wrong matches, end user feedbacks and fallouts, combined with application automated machine learning algorithms, providing and automatic continuous improvement in bot performance.

Referring to FIG. 1, in an aspect the system 100 can include the live agent bot assistance tool 122, which, as described above, can be arranged within or in association with the channel integration platform 112. In an implementation, the channel integration platform 112 can be further configured to interface the AI connector platform 110 to the live agent bot assistance tool 122. The AI connector platform 110 can be configured such that upon the platform 110 receiving an end user search data from one of the chatbot channels 114, the platform 110 also sends the end user search data, for example, through the channel integration platform 112, to the live agent bot assistance tool 122. The live agent bot assistance tool 122 can also be configured to display the received NL search data on a live agent display screen. In an aspect, the live agent bot assistance tool 122 can be further configured to display, with the received NL search data, an identity of the end user who sent the NL search data, e.g., a Facebook user who sent a Facebook Messenger signal carrying the NL search data, to a Facebook page run by the owner of the system 100 content.

In an implementation, the live agent bot assistance tool 122 can also be configured to receive, for example, from the AI connector platform 110, the NPE response to the NL search data that was sent by one of the NPEs, via the NLP plug-in 116, to the platform 110. The live agent bot assistance tool 122 can be further configured to display the NPE response to the NL search data, concurrent with the received NL search data and, in an aspect, with the identity of the end user who sent it. In an implementation, the live agent bot assistance tool 122 can be further configured to monitor for receipt of a send command, concurrent with the display of the NPE response and the NL search data. The implementation can be, for example, a touch screen field of the live agent display screen. In an aspect, the live agent bot assistance tool 122 can also be configured such that, upon receipt of the send command, it can send the NPE response to the customer, through the chatbot channel 114 from which the NL search data was received.

As described above, in an aspect the NPEs can be configured to include a confidence value with the NLP response to the NL search data. For example, assume the NL search data is the text of "I need some guitar strings," and the NLP response of the selected NPE is "I see that you are looking for a guitar that can sound like it's singing." An example confidence value might be, in percentage terms, 65%. The display of that value, can assist the live agent in the decision of whether to send that response to the customer.

Figure 9:
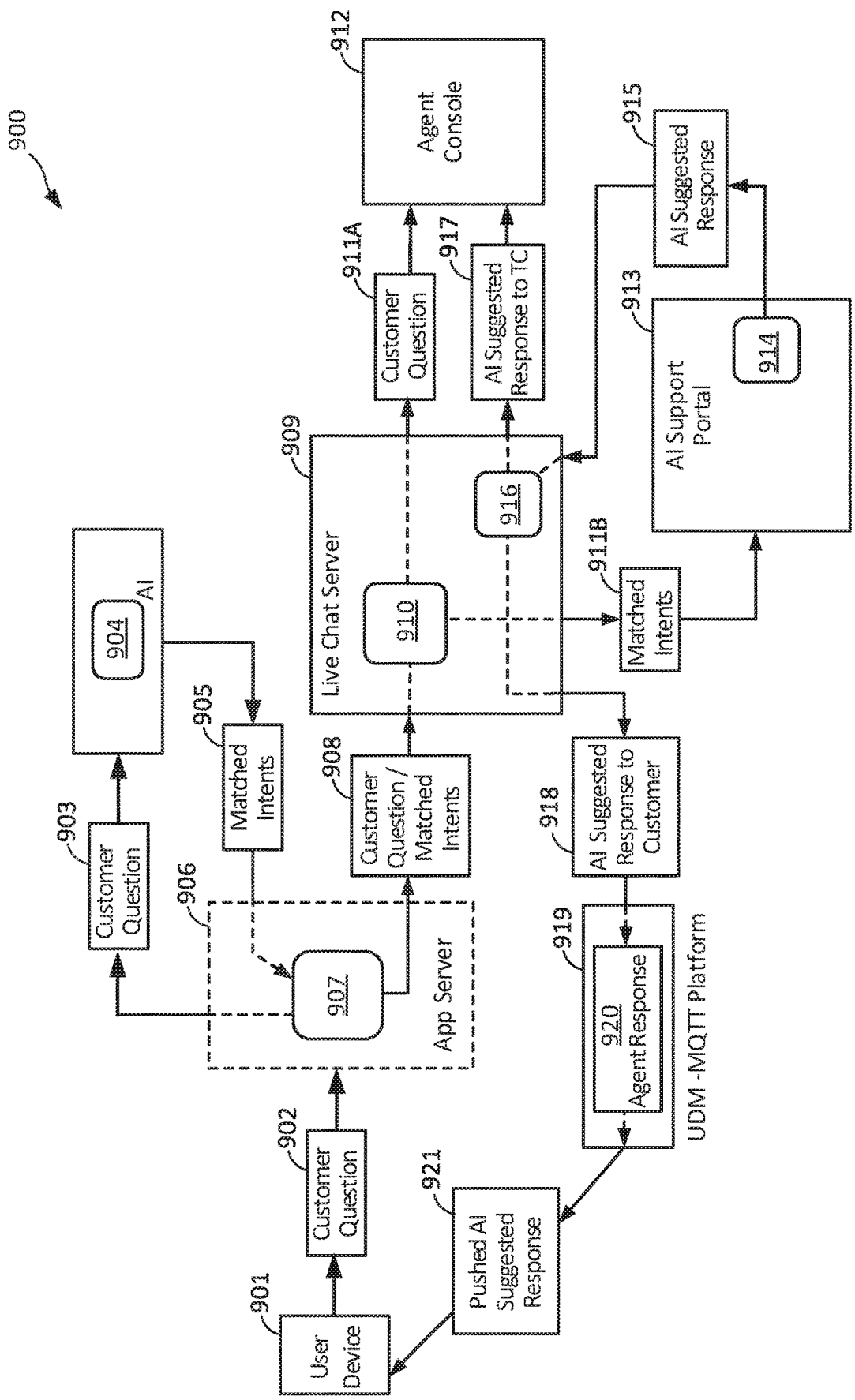
FIG. 9 is a diagram showing functional blocks and logic flow of exemplary operations thereof, in one implementation of a process and supporting system for agent chatbot assistance according to various aspects.

FIG. 9 is a diagram showing functional blocks and logic flow of exemplary operations thereof, in one implementation 900 of a process and supporting system for agent chatbot assistance, according to various aspects. In an example operation, a customer can connect through an end user device 901 to a live chat, for example, by clicking on a web site chat window (not visible in FIG. 9). The connection can use, for example, the FIG. 1 browser accessible web site CH-1 (numbered 114A) going through the channel integration platform 112.

Referring to FIG. 2, at 902 the customer can ask a question, for example, by typing an entry into the chat window. In an implementation, the question can be routed through an app server and, as shown by box 903, can be presented to an AI based NLP engine 904 that, at 905, can search its stored intents for a match to the customer question. Referring to FIGS. 1 and 9, the AI Manager 102 can implement the app server, and provide the presentation at 904 of the customer question, through NLP engine plug-in 116, to one of the NPEs. If the NLP engine search at 905 finds matching intents, it can send these to server 906, for bundling at 907 with the customer question 902. The matching intents can also particular steps in a chatbot conversation tree. For example, assuming one matching intent and the question asked at 902 being the first question from a customer, the matching intent is most likely a first step in a conversation tree. Should the customer respond with follow up questions and the content has multiple steps, the intent(s) returned in 905 may be a second step in the same conversation tree, or can be a first step of another conversation tree that matched the follow up questions. This can continue until the conversation is terminated. In an aspect, each matched intent found also includes its associated responses, in template form, for every channel supported by this conversation. More specifically, referring to FIG. 1 and FIG. 9, each matched intent found at 905 can have its associated response, in template form, for every chatbot channel 114 supported by the channel integration platform 112. In an aspect, the response can include a placeholder, as described above in reference to FIG. 5, block 510. In an aspect, if the response includes a placeholder, it can be filled in at 907 before passing the response as 908. The fill operations can be performed by a conversation controller 118. As an illustration, using the same specific example as used in the FIG. 5, block 510 description above, it will be assumed that the matching intent is "How much is my bill?" and the response is "Your bill is $AMOUNT dollars," having "$AMOUNT" as the placeholder. For purposes of example, it will be assumed that the chatbot channels 114 supported by the channel integration platform 112 to include Facebook™, Twitter™, and WeChat™. These are arbitrarily picked, not intended as any limitation, and not intended to convey any preference of channels. For this example, the intent "How much is my bill?" would have the response "Your bill is $AMOUNT dollars" as a Facebook™ compatible payload (such as illustrated by FIG. 3), as a Twitter™ compatible payload, as a "WeChat™ compatible payload, and as a payload compatible with any other chatbot channels 114 supported by the channel integration platform 112. As described above, an appropriate type of conversation controller 118 may retrieve the "$AMOUNT" data, using an identifier for the customer.

Assuming matching intents are found, i.e., that box 905 is output, the bundled output of 907, of matching intent(s) and the customer question, can be sent as 908, to a live chat server 909. In an aspect, the live chat server 909 can, at 910, decouple the customer question from the matching intent(s). The live chat server 909 can then provide the customer question, shown as box 911A, to a live agent console 912, and also provide the matching intents, shown as box 911B, to an AI support portal 913. As later described herein, in greater detail, the live agent console 912 can include a video display, proximal to the live agent, and functionalities of the display can include, among others, a displaying of the customer question, and a displaying of the list, if any, of one or more matching intents.

Upon the AI support portal 913 receiving the matching intent(s) 911B, portal 913 can, at 914, retrieve, from the chatbot conversation tree associated with the customer question, the bot response for each of those matching intents, and send these, as shown by FIG. 9 box 915 "AI Suggested Response," to the live chat server 909. At 916 the live chat server 909 can forward to the live agent console 912—as shown by box 917—the box 915 "AI Suggested Response."

In an aspect, functionalities of the live agent console 912 video display can also include displaying, with each matching intent, its bot response, i.e., the content of FIG. 9 box 917. As will also be described later in greater detail, the live agent console 912 can provide or present the live agent with means to select from, or approve, matching intents from the displayed list. Upon receipt of the selection input from the live agent, the live agent console 912 can notify the live chat server 909 of the selection(s), whereupon the live chat server 909 can, as shown by box 918, send the selected AI Response(s) toward the customer. In the FIG. 9 illustrated implementation, a Unified Data Model (UDM) Message Queue Telemetry Transport (MQTT) 919 can carry the box 918 content, as Agent Response 920, to be pushed, at 921, to the User Device 901.

FIG. 10-A through FIG. 10-O are screen shots showing, in a snapshot sequence, features and exemplary operations in instances of a process in a method for live agent chatbot assistance according to various aspects. Operations can be provided, for example, by computer executable instructions that will be collectively referenced, for convenience, as the "live agent chatbot assistance module." The term "module," as used in this context and elsewhere herein, means a logical grouping or association, and implies nothing as to physical location or distribution, or technology, of the instructions, or of the resources that execute them.

Description will assume a live customer assistance agent, hereinafter referred to as a "live agent," a live agent display 1001 proximal to the live agent, and an end user equipment (UE) device 1002 proximal to an end user. For purposes of description, the end user will be referred to as "customer." The "customer" reference is not intended to limit practices according to this disclosure to an end user being within the definition of a "customer." Accordingly, the end user UE device 1002 will be referred to as "the customer UE device 1002. The live agent display 1001 can be coupled, for example, to a general purpose personal computer (PC) (not visible in FIG. 10-A through FIG. 10-O) that can connect to the Internet, for example, through a proxy server (not visible in FIG. 10-A through FIG. 10-O). The customer UE device 1002 can be, for example, a smartphone, a notepad, or any other Internet access device having a user interface, e.g., touchpad, or keyboard, and a UE display screen 1003. Practices are not limited to the above examples of a live agent display 1001 and customer UE device 1002. For example, practices can encompass both the customer and the live agent using a portable Internet access device, such as a smartphone.

Referring to FIG. 10-A, at a lower region of the UE display screen 1003 can be a user text entry field 1004. Located on the customer UE device 1002, e.g., a front face, can be a user send button (an example is visible, but not separately numbered).

In one or more implementations, an agent browser (not separately visible in FIG. 10-A through FIG. 10-O) can be provided for the live agent, enabling the agent to access a chat window provided on a web site of an owner of the system 100, and enabling live agent access to any other chatbot channel 114 supported by the channel integration platform 112. The agent browser can be implemented, for example, as a secured browser, e.g., locked to a specific space in the chatbot channel, such as a specific chat window of a web site associated with the owner of the system 100. In a similar aspect, the customer UE device 1002 can host a customer browser (not separately visible in FIG. 10-A through FIG. 10-O), through which the customer can access, for example, the above-described chat window.

In an aspect, an end user voice-to-text resource can be included, for example, in the UE 1002 or in a processing resource between the customer UE device 1002 and the live agent's display 1001. In like manner, a system text-to-voice feature can be included, for example, in the customer UE device 1002. Practices can encompass a customer UE device 1002 not having, or not employing graphical interface entry of text and, instead, operating voice-only.

Referring to FIG. 10-A, the live agent bot assistance tool 122 can present on the live agent display 1001 a field, such as the illustrated live agent transcript field 1005, in which the tool 122 can present a real time updated transcript of a chat session. In an aspect, the live agent bot assistance tool 122 can also present on the live agent display 1001 a field, such as the bot-to-agent assistance field 1006, for real time presentation by the live agent bot assistance tool 122 of assistance to the live agent. As will be described in greater detail in paragraphs that follow, such assistance can include presenting the live agent with search status updates. It can also include, upon the NPE finding one or more matches to a customer text input, the live agent display 1001 presenting to the live agent with the one or more NPE matches, and bot response associated with each. As an example, assuming an intent of "Needs Taxi," the associated bot response can be "Please tell me the number of passengers, and the pick-up address, etc." The live agent bot assistance tool 122 can include, in one or more implementations, the NPE confidence in the match. The confidence measure can be expressed, for example, as a percentage. As illustration, using the taxi example above, the live agent bot assistance tool 122 may can include with the bot response a percentage, such as "95%."

Referring to FIG. 10-A, the live agent bot assistance tool 122 can include display of a customer ID information, arranged on the display such as the illustrated "Customer ID" field 1007 in the bot-to-agent assistance field 1006.

The live agent bot assistance tool 122 can present on the live agent display 1001 an Autopilot ON/OFF field, such as the example, 1008, which can be configured to indicate the ON-OFF status of the Autopilot. Features and operations of the Autopilot are described in greater detail in later sections of this disclosure. In an implementation, the Autopilot ON/OFF field 1008 can be configured as an ON-OFF switch, for example, a click field.

The live agent bot assistance tool 122 can configure within the live agent display 1001 a field, such the type reply field 1009, in which the agent can type responses to questions or statements received from the customer UE device 1002. An agent response send button, such as the illustrated example 1010, can be located, for example, proximal to the type reply field 1009. These features can provide the live agent a seamless pass option, usable in events such as fallout incidents, i.e., when the NLP engine does not find a match for the customer's search expression. These features can enable an operational mode, described in greater detail below, in which the live agent can refrain, for a specific NPE match, from hitting the send button and, instead type and send a response to the customer.

Additional interface fields the module can provide as content to the live agent display 1001 will be described in reference to example operations shown by FIG. 10-B through FIG. 10-O. It will be understood that specific arrangements for the live agent display 1001 illustrated by any of FIG. 10-A through FIG. 10-O, are examples, and not intended as any limitation on the arrangements and configurations that can be used.

Implementations can be employed when the live agent is among a plurality of live agents. In one or more configurations, techniques for distributing call load among the live agents, can be a modification of conventional live-agent call distribution techniques. The modification can include, as will be appreciated by persons of ordinary skill upon reading this disclosure, a higher customer load per live agent than may be applied when the live agents are using practices not in accordance with this disclosure.

Referring to FIG. 10-B, operation assumes a live chat session has been initiated, for example, by the customer clicking on a live chat button, on a commercial or government entity's web site. Operations will assume the live agent has switched the Autopilot OFF, as indicated by the FIG. 10-B state of the Autopilot ON/OFF field 1008. The customer can start the conversation by typing into the user text entry field 1004 of the UE device 1002, for example, by keyboard or a touchpad, a statement or question. FIG. 10-B illustrates a generic example of "Customer Input 1." A specific example can be "When is my payment due?" Another example can be "How do I upgrade my service plan?" The customer, upon approving the text input, can press or otherwise activate the UE send button and, referring to FIG. 10-C. The send can be indicated on the UE display 1003 by, for example, the customer "sent" conversation bubble 1011A. This can start the UE device 1002 running record of the live chat transcript. The "A" suffix is according to a labelling scheme used for the description in which successive "sent" conversation bubbles are labeled "1011B, 1011C, . . . etc.

Customer input can be communicated, for example, through the FIG. 1 channel integration platform 112, to the particular chatbot channel 114 used for the discussion. Receipt by the live agent can be indicated by the customer input bubble 1012A on the live agent chat transcript field 1005. The customer input bubble 1012A can include a customer ID field and a time received field (visible but not separately numbered). Not visible in FIG. 10-B and FIG. 10-C, the customer send operation can also effectuate (transparent to the customer) a communication of Customer Input 1 to the NPE e.g., through via the FIG. 1 AI connector platform 110, and the NLP plug-in 116. The NPE can send the live agent updates on the search status, for display on the bot-to-agent assistance field 1006 of the live agent display 1001, through NLP plug-in 116 and AI connector platform 110. The snapshot at FIG. 10-C assumes the NPE is still searching for a match, and accordingly, the bot-to-agent assistance field 1006 displays a "Searching for Match" field 1013A.

The instant example assumes the NPE finds two intents that match Customer Input 1. Referring to FIG. 10-D, the two can appear as a stack of two NPE match results in the bot-to-agent assistance field 1006. Each of the two NPE match results can include a matched intent field 1013 displaying the matching intent, a confidence measure field 1014 that displays a confidence measure in the match, and a matching response field 1015 that displays the response associated with the matching intent identified in field 1013. In the FIG. 10-D snapshot, "IT-1A" in field 2013 of the upper NPE match can be a text name for the first of the two matching intents, and "IT-1B" in field 2013 of the lower NPE match intent field 2013, and "IT-1B" can be a text name for the second of the two matching intents. Regarding the labels "IT-1A" and "IT-1B," the labelling scheme used for this example is as follows: "IT" identifies the labeled content as a matching intent identifier, the numeral "1" indicates the matching intent as matching Customer Input 1, A" indicates the matching intent as being one of a plurality of matching intents that the NPE found, and "B" indicates the matching intent as another of a plurality of matching intents that the NPE found.

Referring to the FIG. 10-D snapshot, the "CM(IT-1A)" value in confidence measure field 1014 of the upper NPE match can be a displayable numerical value, for example, a percentage value, that identifies the NPE confidence in the matching intent IT-1A. "CM(IT-1B)" in field 1014 of the lower NPE match can be a displayable numerical value specifying the NPE confidence in the matching intent IT-1B. "Response (IT-1A)" in field 1015 of the upper NPE match can be a displayable text of the response associated with matching intent IT-1A. For purposes of description, Response (IT-1A) will be alternatively referred to as "response to matching intent IT-1A," and Response (IT-1B) will be alternatively referred to as "response to matching intent IT-1B." In an implementation, Response (IT-1A) and Response (IT-1B) may be established at creation of matching intent IT-1A, and matching intent IT-1B, respectively. The above described content for fields 1013, 1014, and 1015 can be provided by the NPE in the results it communicates back, through NLP plug-in 116, to the AI connector platform 110.

As described above, it is assumed that the Autopilot is OFF. In an aspect, sending the matching response to the UE device 1002 with Autopilot OFF can require affirmative action by the live agent. Provision for such action can be through a matching response "Send" button 1016 included with each NPE match presented on the live agent display 1001. In another implementation, instead of a matching response "Send" button 1016, the NPE match field can include a matching response "Stop" (not visible in the figures) button, wherein affirmative action can be a timer based default, i.e., a timer having a given time-out setting starts when the NPE match is presented on the live agent display 1001, and only if the live agent activates the Stop button before the time-out, the matching result from the NPE match will be sent to the UE device 1002.

In the present operation, the live agent may look at the stack of two NPE match results, including their respective matching intent field, confidence measure field, and matching response fields, 1013, 1014, and 1015. Depending on the apparent appropriateness or correctness of each of matching intent IT-1A and matching intent IT-1A, in view of the Customer Input 1, the live agent can activate the Send button 1016 for one, or both, or neither of the two NPE match results. In implementation, in operations where the Autopilot is ON, NPE match results, or only NPE match results that meet threshold conditions, can be automatically communicated to the customer's UE device 1002.

For purposes of example, it will be assumed that both of the FIG. 10-D NPE match results appear appropriate. Accordingly, the live agent can activate the send button 1016 for both. The FIG. 10-E snapshot shows aspects results from the live agent activating the send button 1016 for NPE match result identifying (IT-1A) as the matching result. As shown, the matching response (IT-1A) in field 1015 is sent from the live agent to the customer's UE device 1002. Record of the sending operation appears as live agent send bubble 1017A in the live agent's conversation transcript field 1005, and record of the reception appears as agent response received bubble 1018A on the UE device display screen 1003. Referring to FIG. 10-E, the content of the agent response received bubble 1018A is "Agent Response to C-1)," where "C-1" means Customer Input 1.

As shown in FIG. 10-E, the live agent send bubble 1017A can have a sender ID field and a time sent field (both visible in FIG. 10-E, but not separately numbered). Since the send shown by FIG. 10-E was by action of the live agent, the content of the live agent send bubble 1017A Sender ID field is "Agent ID," i.e., the live agent's ID. In examples later described, the sender ID field of live agent send bubbles 1017X will indicate the response as an auto send by the Autopilot.

Upon the live agent activating the send button 1016 of the other of the two NPE match results visible in FIG. 10-D, i.e., the one identifying Response (IT-1B) as the matching result, communications can basically repeat those described above. More specifically, referring to FIG. 10-F, record appears as live agent send bubble 1017B in the live agent's conversation transcript field 1005, and agent response received bubble 1018B on the UE device display screen 1003.

Referring to the FIG. 10-G snapshot, this illustrates the customer having typed a second customer input, or Customer Input 2, into the text input field 1004, and having activated the UE device 1002 send button. The result appears as "Customer Input 2" in a user send bubble 1011B on the US device display 1003, and as "Customer Input 2" in another received customer input bubble 1012B on the live agent's transcript field 1005. The snapshot at FIG. 10-G, assumes the NPE is still searching for a match, and therefore displays a "Searching for Match" field 1013B.

Referring to the FIG. 10-H snapshot, what is illustrated is the NPE having found a matching intent "IT-2" and due, for example, to a high confidence value of the match, the Autopilot has automatically switched ON, and auto-sent a matching response as "Auto-Reply Response (IT-2).". The sending is indicated by the "AutoReply sent" indicator instance 1019A in the bot-to-agent assistance field 1006, another agent send bubble, 1017C, in the live agent's chat transcript field 1005, and as agent response received bubble 1018C on the UE device display screen 1003. The content of the bubble 1018C is "Agent Response to C-2," i.e., appears to the customer as a regular response from the live agent. Referring to the agent send bubble 1017C, it can be seen that the Sender ID is "AutoReply."

The FIG. 10-I snapshot follows the customer sending "Customer Input 3," after the above-described switching AutoPilot operations. Referring to FIG. 10-I, the sending is shown by "Customer Input 3" in the customer send bubble 1011C on the customer's display 1003, and "Customer Input 3" in the received customer input bubble 1012C in the live agent's transcript field 1005. At the FIG. 10-I snapshot, the NPE search is in progress, as shown by a "Searching for Match" indicator 1013C. Referring to FIG. 10-J, the example assumes the NPE finds a matching intent and due, for example, to a high confidence match, the system remains in AutoPilot and auto sends the matching response, "Response (IT-3)," to the customer. This is shown by the "AutoReply Sent" indicator 1019B in field 1006 of the live agent's display 1001 and, in field 1005, agent send bubble 1017D having "AutoReply" in its sender ID field. Receipt by the UE device 1002 is shown as received agent response bubble 1018D. The content of the bubble 1018D is "Agent Response to C-3," i.e., appears to the customer as a regular response from the live agent.

The FIG. 10-K snapshot follows the customer sending customer input 4, with AutoPilot ON. The sending is shown by "Customer Input 4" in the customer send bubble 1011D on the customer's display 1003, and resulting "Customer Input 4" in the customer input bubble 1012D in the live agent's transcript field 1005. At the FIG. 10-K snapshot, the NPE search is in progress, as shown by a "Searching for Match" indicator 1013D. The FIG. 10-L snapshot illustrates the NPE having completed its search, and this time the response is "Match Not Found" 1020. The "Match Not Found" 1020 response can include, in an implementation, a status field 1021 that can indicate that a match was not found, and that the Autopilot has switched off. The "Match Not Found" 1220 can include a "Suggested Response" in field 1022, and a Suggested Response Send button 1023.

The live agent in this example scenario, with the example FIG. 10-L snapshot on the live agent display 1001, has a choice of options. One option can be the agent activating the Suggested Response Send button 1023. The system can be configured such that this action will send the content of the Suggested Response field 1022 to the customer UE device 1002. In an aspect, such a response, as received by the UE device 1002, can appear like a regular live agent response. Another of the options system 100 can present to the live agent is an enablement for the live agent to type a response into the live agent entry field 1009, and hit the live agent response send button 1010. Another option can be an enablement of the live agent to exercise both of the above-described options, i.e., hit the Suggested Response Send button 1023, and type and send a response.

For purposes of this example, it will be assumed that the live agent selected the lattermost of the provided options. Referring to the FIG. 10-M snapshot, exemplary operations of exercising that option can include the live agent typing a response for transmission to the customer, as represented generically by the example "Agent Typed Response" in the live agent typing input field 1009. The FIG. 10-N snapshot shows a result of the live agent completing the typed response option, namely sending the Agent Typed Response to the customer's UE device 1002. This is illustrated by the live agent send bubble 1017D, carrying "AGT Typed Response," ("AGT being an abbreviation for "Live Agent"), and having in its sender ID field "AGT RSP" ("RSP" being an abbreviation for "Response"). The UE device 1002 sees the Agent Typed Response as appearing as all other Agent Response's, as shown by received agent response bubble 1018E carrying "Agent Response to C-4."

Referring to the FIG. 10-O snapshot, operational result of the live agent exercising the send suggested response option can include a sending to the customer's UE device 1002 the content of the Suggested Response field 1022 of the Agent's Response. This is illustrated by the live agent send bubble 1017E, carrying Suggested Response, and having in its sender ID field "SGT Reply" ("SGT Reply" that appears in FIG. 10-O being an arbitrary abbreviation for "Suggested Response"). Receipt of the Suggested Response by the UE device 1002 is shown by the received agent response bubble 1018F, carrying another "Agent Response to C4."

Figure 11:
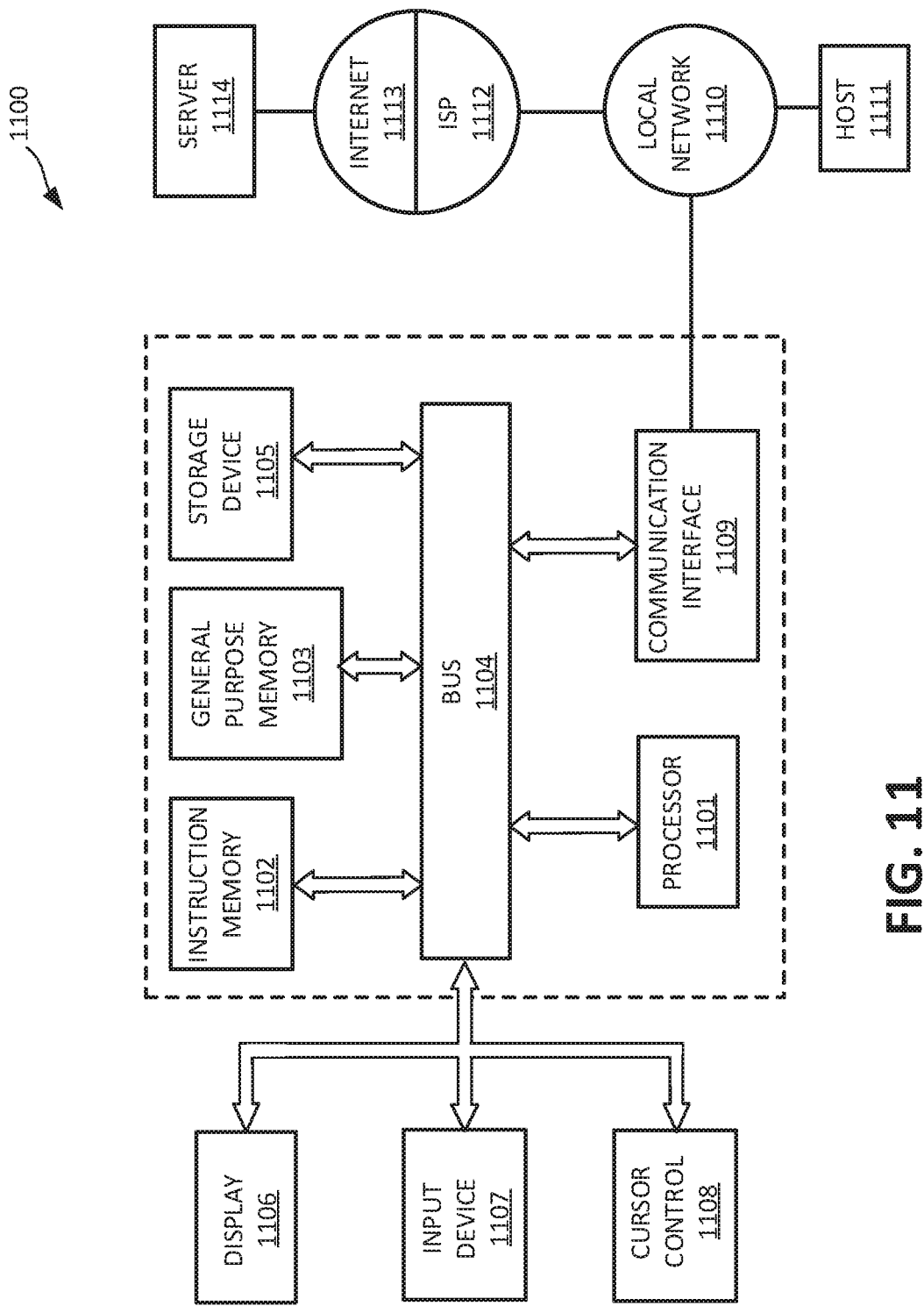
FIG. 11 is a block diagram illustrating a computer system upon which aspects of this disclosure may be implemented.

FIG. 11 is a block diagram illustrating a computer system 1100 upon which aspects of this disclosure may be implemented, such as, but not limited to, particular controllers, logic blocks, and controller processes described in reference to FIGS. 5-11. It will be understood that logic blocks illustrated in FIG. 11 represent functions, and do not necessarily correspond to particular hardware on a one-to-one basis.

The FIG. 11 illustrated computer system 1100 can include a processor 1101, instruction memory 1102, and a general purpose memory 1103, coupled by a bus 1104. The computer system 1100 can also include a storage device 1105, for example, a large capacity disc drive or solid-state drive, coupled to the bus 1104. The instruction memory 1102 can include a tangible medium that retrievably stores computer-readable instructions that when executed by the processor 1101 cause the processor to perform operations, such as described for the controller 118 illustrated in and described in reference to one or more of FIGS. 3-100.

The computer system 1100 can also include a display 1106, an input device 1107, and a cursor control 1108, all connected to the bus 1104. In various implementations, any two or more of the display 1106, input device 1107, and cursor control 1108 can be implemented with a single hardware apparatus, for example, a touch screen. Example implementations of the input device 1107 can also include, without limitation, removable disc drive, memory stick, Bluetooth, near field communication, and hardwire connection. Implementations of the cursor control 1108 can include, for example, and without limitation, any one or more of a track pad, mouse, joystick, track ball, microphone, and keypad arrows.

The computer system 1100 can also include a communications interface 1109, configured to interface with a local network 1110 for accessing a local server 1111, and to communicate through an Internet service provider (ISP) 1112 to the Internet 1113, and access a remote server 1114.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

While the foregoing has described what are considered to be the best mode and/or other examples, it is understood that various modifications may be made therein and that the subject matter disclosed herein may be implemented in various forms and examples, and may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for chatbot conversation construction and management for switching among natural language process (NLP) engines, comprising:
    an artificial intelligence (AI) connector platform, the AI connector platform including:
        a conversation tree logic,
        application connectors, configured to communicate with at least one chatbot access channel, and
        an NLP core, the NLP core including a generic interface, the generic interface having a given generic NLP engine input/output (I/O) protocol facing the conversation tree logic, and an outward facing I/O protocol that is changeable among mutually different NLP engine I/O protocols; and
    an AI manager platform, the AI manager platform being configured to:
        receive conversation controller configuration data and, in response, construct and store conversation controllers, the conversation controller being blocks of re-usable logic, of a plurality of types, configured to integrate into the conversation tree logic, and
        receive chatbot conversation description data and, based at least in part on the chatbot conversation description data and at least one of the conversation controllers, reconfigure the conversation tree logic to the outward facing I/O protocol by implementing a fallout logic to provide a suggestion for a user to rephrase an unrecognizable question and identify at least a certain number of attempts that rephrase the unrecognizable question as a fallout incidence for fallout clustering, wherein the fallout clustering includes obtaining and validating a fallout cluster for incorporating into the conversation tree logic to reduce fallout.

2. The system of claim 1, wherein the system further includes:
    an NLP plug in, coupled to the AI connector platform and configured to communicate with one or more among a plurality of mutually different NLP engines.

3. The system of claim 1, wherein the conversation controller types include a conversation flow controller, the conversation flow controller being configured to determine an access authority level or classification of an end user associated with an end user device, and to control a conversation flow based at least in part on the determined access authority level or classification.

4. The system of claim 1, wherein the AI connector platform is further configured to:
    generate and apply an event-based updating of a record of wrong matches,
    generate, based on a trigger criterion, reports of the wrong matches, and
    communicate the reports of the wrong matches to the AI Manager platform.

5. The system of claim 4, wherein:
    the AI Manager platform includes, or is associated with a bot matching improvement logic, and
    the bot matching improvement logic is configured to determine clusters from user inputs associated with the wrong matches and, based at least in part on a quality criterion for the clusters, to add the clusters back to the NLP engine.

6. The system of claim 1, wherein the AI connector platform is further configured to:
    receive a natural language (NL) search data, through a chatbot access channel, from a user device,
    communicate, through the generic interface, at least a portion of the NL search data, to an external NLP engine,
    receive, through the generic interface from the external NLP engine, a matching intent,
    retrieve, from the conversation tree logic, a bot response to the matching intent, and
    send the bot response to the user device.

7. The system of claim 6,
wherein the system further includes a live agent bot assistance tool, the live agent bot assistance tool being configured to:
receive the matching intent, the NL search data, and the bot response,
display the matching intent, the NL search data, and the bot response on a live agent display screen,
monitor for receipt of a send command, from the live agent, concurrent with the display of the bot response, and
upon receipt of the send command, send the bot response, through the chatbot access channel to the user device.

8. The system of claim 7, wherein:
the bot response to the NL search data includes a confidence value, and
the live agent chatbot assistance tool is further configured to display the confidence value concurrent with the matching intent, the NL search data, and the bot response,
wherein the live agent chatbot assistance tool is further configured to:
display, concurrent with the display of the bot response deliverable to the chatbot access channel and the NL search data, a field on the live agent display for receipt of an input of a live agent response to the NL search data, and a field for entry of a command to send the live agent response, and
upon receipt of the command to send the live agent response, send the live agent response data to the chatbot access channel.

9. The system of claim 1, wherein the conversation tree logic is associated with the NLP core.

10. A method for chatbot conversation construction and management for switching among natural language (NLP) engines, comprising:
receiving a desired chat conversation flow, the flow including steps, wherein at least one of the steps is based on an expectation of receiving user text;
based at least in part on the chat conversation flow, constructing a conversation tree;
populating textual responses for steps associated with the conversation tree;
assigning an NLP engine, the NLP engine having an interface protocol;
building an integration to the NLP engine's interface protocol;
training one or more of the steps that are configured to receive the user text;
inserting metadata at decision points in the conversation tree; and
testing performance of the chat conversation flow by providing a suggestion for a user to rephrase a question in the user text that the NLP engine cannot recognize and identifying at least a certain number of attempts that rephrase the question as a fallout incidence for fallout clustering, wherein the fallout clustering includes obtaining and validating a fallout cluster for incorporating into the conversation tree logic to reduce fallout.

11. The method of claim 10, wherein operations in building the integration to the NLP engine's interface protocol include:
exposing the NLP engine's interface protocol to a front-end system, wherein the front-end system includes a chat window in a web page, a native phone application, or a combination thereof.

12. The method of claim 10, wherein receiving the desired chat conversation flow includes:
displaying, as a user-response conditional sequence, a conversation data entry templates; and
reading entries from the conversation data entry templates.

13. The method of claim 10, wherein receiving the desired chat conversation flow includes:
guiding a user in entering the chat conversation flow, through an interaction with a chatbot conversation.

14. The method of claim 12, wherein one or more of the conversation data entry templates include a placeholder, the placeholder being a field that requires a run time insertion of a specified data, and the method further includes:
parameterizing template responses that have placeholders.

15. The method of claim 10, wherein the method further includes:
storing a plurality of conversation controllers, each configured for a run-time interaction with one or more steps in the chat conversation flow, and
connecting each of one or more of the conversation controllers to a corresponding one or more of the steps.

16. The method of claim 15, wherein at least one of the conversation controllers is configured to perform, at run time, a retrieval of information relating to the chat conversation flow.

17. The method of claim 15, wherein at least one of the conversation controllers is further configured to:
determine an access authority level or classification of an end user associated with an end user device, and
control the chat conversation flow based at least in part on the determined access authority level or classification.

18. The method of claim 15, wherein at least one of the conversation controllers is structured as a re-usable code.

19. The method of claim 10, wherein the method further comprises:
inserting reporting logic, wherein the reporting logic includes logic configured to generate and update records of wrong matches, and records of suggesting a re-phrasing.

20. The method of claim 10, wherein the method further comprises:
receiving a natural language (NL) search data, through a chatbot access channel, from a user device;
communicating, to an external NLP engine, at least a portion of the NL search data;
receiving, from the external NLP engine, a matching intent;
retrieving, from the conversation tree, a bot response to the matching intent; and
sending the bot response to the user device.

* * * * *